(12) United States Patent  
DiSalvo et al.

(10) Patent No.: US 7,463,124 B2  
(45) Date of Patent: *Dec. 9, 2008

(54) CIRCUIT INTERRUPTING DEVICE WITH REVERSE WIRING PROTECTION

(75) Inventors: Nicholas L. DiSalvo, Levittown, NY (US); William R. Ziegler, East Northport, NY (US)

(73) Assignee: Leviton Manufacturing Co., Inc., Little Neck, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/977,929

(22) Filed: Oct. 28, 2004

(65) Prior Publication Data

US 2005/0063110 A1 Mar. 24, 2005

Related U.S. Application Data

(63) Continuation of application No. 10/827,093, filed on Apr. 19, 2004, now Pat. No. 6,864,766, which is a continuation of application No. 10/223,284, filed on Aug. 19, 2002, now Pat. No. 6,813,126, which is a continuation of application No. 09/879,563, filed on Jun. 11, 2001, now Pat. No. 6,437,953, which is a continuation of application No. 09/379,138, filed on Aug. 20, 1999, now Pat. No. 6,246,558, which is a continuation-in-part of application No. 09/138,955, filed on Aug. 24, 1998, now Pat. No. 6,040,967.

(51) Int. Cl.  
*H01H 73/00* (2006.01)

(52) U.S. Cl. .......................................... 335/18; 361/42

(58) Field of Classification Search .................. 335/18; 361/42–51  
See application file for complete search history.

(56) References Cited

U.S. PATENT DOCUMENTS

| | | | |
|---|---|---|---|
| 3,309,571 A | 3/1967 | Gilker |
| 3,538,477 A | 11/1970 | Walters et al. |
| 3,702,418 A | 11/1972 | Obenhaus |
| 3,766,434 A | 10/1973 | Sherman |

(Continued)

FOREIGN PATENT DOCUMENTS

DE 2281138 11/1978

(Continued)

*Primary Examiner*—Elvin Enad  
*Assistant Examiner*—Bernard Rojas  
(74) *Attorney, Agent, or Firm*—Paul J. Sutton

(57) ABSTRACT

Resettable circuit interrupting devices, such as GFCI devices, that include reverse wiring protection, and optionally an independent trip portions and/or a reset lockout portion are provided. The reverse wiring protection operates at both the line and load sides of the device so that in the event line side wiring to the device is improperly connected to the load side, fault protection for the device remains. The trip portion operates independently of a circuit interrupting portion used to break the electrical continuity in one or more conductive paths in the device. The reset lockout portion prevents the reestablishing of electrical continuity in open conductive paths if the circuit interrupting portion is non-operational or if an open neutral condition exists.

45 Claims, 21 Drawing Sheets

U.S. PATENT DOCUMENTS

| | | | |
|---|---|---|---|
| 3,813,579 A | 5/1974 | Doyle | |
| 3,864,649 A | 2/1975 | Doyle | |
| 3,872,354 A | 3/1975 | Nestor et al. | |
| 3,949,336 A | 4/1976 | Dietz | |
| 4,002,951 A | 1/1977 | Halbeck | |
| 4,010,431 A | 3/1977 | Virani | |
| 4,010,432 A | 3/1977 | Klein | |
| 4,034,266 A | 7/1977 | Virani et al. | |
| 4,034,360 A | 7/1977 | Schweitzer, Jr. | |
| 4,051,544 A | 9/1977 | Vibert | |
| 4,063,299 A | 12/1977 | Munroe | |
| 4,109,226 A | 8/1978 | Bowling | |
| 4,114,123 A | 9/1978 | Grenier | |
| 4,159,499 A | 6/1979 | Bereskin | |
| 4,163,882 A | 8/1979 | Baslow | |
| 4,194,231 A | 3/1980 | Klein | |
| 4,223,365 A | 9/1980 | Moran | |
| 4,288,768 A | 9/1981 | Arnold et al. | |
| 4,316,230 A | 2/1982 | Hansen et al. | |
| 4,377,837 A | 3/1983 | Matsko | |
| 4,386,338 A | 5/1983 | Doyle | |
| 4,409,574 A | 10/1983 | Misencik | |
| 4,412,193 A | 10/1983 | Bienwald | |
| 4,442,470 A | 4/1984 | Misencik | |
| 4,515,945 A | 5/1985 | Ranken et al. | |
| 4,518,945 A | 5/1985 | Doyle | |
| 4,521,824 A | 6/1985 | Morris et al. | |
| 4,538,040 A | 8/1985 | Ronemus | |
| 4,567,456 A | 1/1986 | Legatti | |
| 4,568,899 A | 2/1986 | May | |
| 4,574,260 A | 3/1986 | Franks | |
| 4,578,732 A * | 3/1986 | Draper et al. | 361/45 |
| 4,587,588 A | 5/1986 | Goldstein | |
| 4,595,894 A | 6/1986 | Doyle et al. | |
| 4,630,015 A | 12/1986 | Gernhardt et al. | |
| 4,631,624 A | 12/1986 | Dvorak et al. | |
| 4,641,216 A | 2/1987 | Morris et al. | |
| 4,641,217 A | 2/1987 | Morris et al. | |
| 4,686,600 A | 8/1987 | Morris et al. | |
| 4,719,437 A | 1/1988 | Yun | |
| 4,802,052 A | 1/1989 | Brant et al. | |
| 4,814,641 A | 3/1989 | Dufresne | |
| 4,816,957 A | 3/1989 | Irwin | |
| 4,851,951 A | 7/1989 | Foster, Jr. | |
| 4,901,183 A | 2/1990 | Lee | |
| 4,949,070 A | 8/1990 | Wetzel | |
| 4,967,308 A | 10/1990 | Morse | |
| 4,979,070 A | 12/1990 | Bodkin | |
| 5,144,516 A | 9/1992 | Sham | |
| 5,148,344 A | 9/1992 | Rao | |
| 5,161,240 A | 11/1992 | Johnson | |
| 5,179,491 A | 1/1993 | Runyan | |
| 5,185,687 A | 2/1993 | Beihoff | |
| 5,202,662 A | 4/1993 | Bienwald et al. | |
| 5,218,331 A | 6/1993 | Morris | |
| 5,223,810 A | 6/1993 | Van Haaren | |
| 5,224,006 A | 6/1993 | MacKenzie et al. | |
| 5,229,730 A | 7/1993 | Legatti | |
| 5,239,438 A | 8/1993 | Echtler | |
| 5,293,522 A | 3/1994 | Fello | |
| 5,363,269 A | 11/1994 | McDonald | |
| 5,418,678 A | 5/1995 | McDonald | |
| 5,448,443 A | 9/1995 | Muelleman | |
| 5,477,412 A | 12/1995 | Neiger et al. | |
| 5,510,760 A | 4/1996 | Marcou et al. | |
| 5,515,218 A | 5/1996 | DeHaven | |
| 5,517,165 A | 5/1996 | Cook | |
| 5,541,800 A | 7/1996 | Misencik | |
| 5,576,580 A | 11/1996 | Hosoda et al. | |
| 5,594,398 A | 1/1997 | Marcou et al. | |
| 5,600,524 A | 2/1997 | Neiger et al. | |
| 5,654,857 A | 8/1997 | Gershen | |
| 5,655,648 A | 8/1997 | Rosen | |
| 5,661,623 A | 8/1997 | McDonald et al. | |
| 5,680,287 A | 10/1997 | Gernhardt | |
| 5,694,280 A | 12/1997 | Zhou | |
| 5,706,155 A | 1/1998 | Neiger et al. | |
| 5,710,399 A | 1/1998 | Castonguay et al. | |
| 5,715,125 A | 2/1998 | Neiger | |
| 5,729,417 A | 3/1998 | Neiger et al. | |
| 5,805,397 A | 9/1998 | MacKenzie | |
| 5,815,363 A | 9/1998 | Chu | |
| 5,825,602 A | 10/1998 | Tosaka et al. | |
| 5,844,765 A | 12/1998 | Kato et al. | |
| 5,877,925 A | 3/1999 | Singer | |
| 5,917,686 A | 6/1999 | Chan | |
| 5,920,451 A | 7/1999 | Fasano et al. | |
| 5,933,063 A * | 8/1999 | Keung et al. | 335/18 |
| 5,943,198 A | 8/1999 | Hirsh et al. | |
| 5,956,218 A | 9/1999 | Berthold | |
| 6,021,034 A | 2/2000 | Chan et al. | |
| 6,040,967 A * | 3/2000 | DiSalvo | 361/42 |
| 6,052,265 A | 4/2000 | Zaretsky et al. | |
| 6,180,899 B1 | 1/2001 | Passow | |
| 6,204,743 B1 | 3/2001 | Greenberg et al. | |
| 6,226,161 B1 | 5/2001 | Neiger et al. | |
| 6,232,857 B1 | 5/2001 | Mason, Jr. et al. | |
| 6,242,993 B1 | 6/2001 | Fleege et al. | |
| 6,246,558 B1 | 6/2001 | DiSalvo et al. | |
| 6,252,407 B1 | 6/2001 | Gershen | |
| 6,255,923 B1 | 7/2001 | Mason, Jr. et al. | |
| 6,259,340 B1 | 7/2001 | Fuhr et al. | |
| 6,381,113 B1 | 4/2002 | Legatti | |
| 6,545,574 B1 | 4/2003 | Seymour et al. | |
| 6,590,753 B1 | 7/2003 | Finlay | |
| 6,657,834 B2 * | 12/2003 | DiSalvo | 361/42 |
| 6,864,766 B2 * | 3/2005 | DiSalvo et al. | 335/18 |

FOREIGN PATENT DOCUMENTS

| | | |
|---|---|---|
| DE | 3431 581 C2 | 11/1991 |
| DE | 3341581 | 11/1991 |
| EP | 081661 | 6/1983 |
| ES | 21345 8/77 | 5/1978 |
| FR | 2391549 | 12/1978 |
| GB | 227930 | 1/1925 |
| GB | 830018 | 9/1960 |
| GB | 2207823 | 8/1989 |
| GB | 2292491 | 2/1996 |
| JP | 61-259428 | 11/1986 |

* cited by examiner

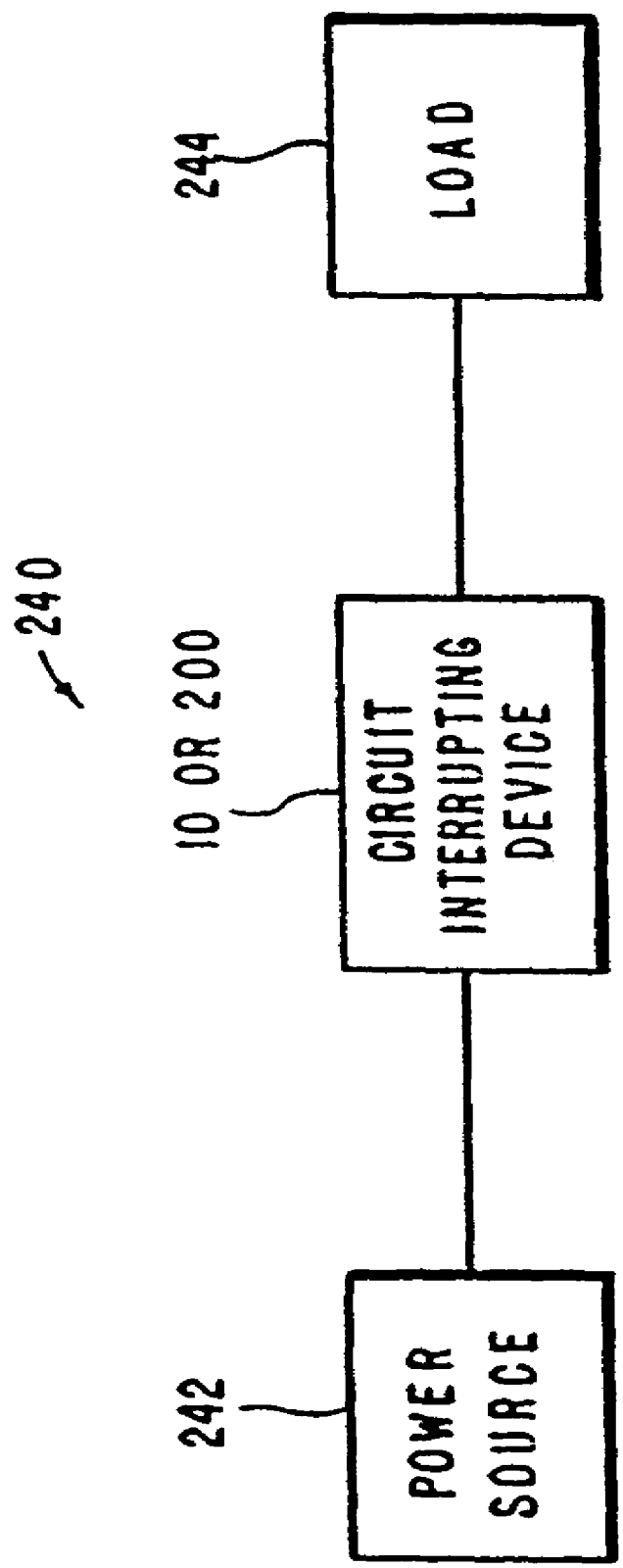

CIRCUIT INTERRUPTING DEVICE WITH REVERSE WIRING PROTECTION

This application is a continuation of application Ser. No. 10/827,093 filed Apr. 19, 2004, (now U.S. Pat. No. 6,864,766) which is a continuation of application Ser. No. 10/223,284 filed Aug. 19, 2002 (now U.S. Pat. No. 6,813,126), which is a continuation of application Ser. No. 09/879,563 filed Jun. 11, 2001 (now U.S. Pat. No. 6,437,953), which is a continuation of application Ser. No. 09/379,138 filed Aug. 20, 1999 (now U.S. Pat. No. 6,246,558), which is a continuation-in-part of application Ser. No. 09/138,955, filed Aug. 24, 1998 (now U.S. Pat. No. 6,040,967), all of which are incorporated herein in their entirety by reference.

BACKGROUND

1. Field

The present application is directed to reset lockout devices including resettable circuit interrupting devices and systems such as ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI), for example. Presently available GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise where an abnormal condition, caused by for example a lightning strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices, which have tripped, may be reset even though the open neutral condition may remain.

Commonly owned application Ser. No. 09/138,955, filed Aug. 24, 1998, which is incorporated herein in its entirety by reference, describes a family of resettable circuit interrupting devices capable of locking out the reset portion of the device if the circuit interrupting portion is non-operational or if an open neutral condition exists. Commonly owned application Ser. No. 09/175,228, filed Sep. 20, 1998, which is incorporated herein in its entirety by reference, describes a family of resettable circuit interrupting devices capable of locking out the reset portion of the device if the circuit interrupting portion is non-operational or if an open neutral condition exists and capable of breaking electrical conductive paths independent of the operation of the circuit interrupting portion.

Some of the circuit interrupting devices described above have a user accessible load side connection in addition to the line and load side connections. The user accessible load side connection includes one or more connection points where a user can externally connect to electrical power supplied from the line side. The load side connection and user accessible load side connection are typically electrically connected together. An example of such a circuit interrupting device is a GFCI receptacle, where the line and load side connections are binding screws and the user accessible load side connection is the plug connection. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains.

SUMMARY

The present application relates to a family of resettable circuit interrupting devices that maintains fault protection for the circuit interrupting device even if the device is reverse wired.

In one embodiment, the circuit interrupting device includes a housing and phase and neutral conductive paths disposed at least partially within the housing between line and load sides. Preferably, the phase conductive path terminates at a first connection capable of being electrically connected to a source of electricity, a second connection capable of conducting electricity to at least one load and a third connection capable of conducting electricity to at least one user accessible load. Similarly, the neutral conductive path, preferably, terminates at a first connection capable of being electrically connected to a source of electricity, a second connection capable of providing a neutral connection to the at least one load and a third connection capable of providing a neutral connection to the at least one user accessible load;

The circuit interrupting device also includes a circuit interrupting portion that is disposed within the housing and configured to cause electrical discontinuity in one or both of the phase and neutral conductive paths, between said line side and said load side upon the occurrence of a predetermined condition. A reset portion is disposed at least partially within the housing and is configured to reestablish electrical continuity in the open conductive paths.

Preferably, the phase conductive path includes a plurality of contacts that are capable of opening to cause electrical discontinuity in the phase conductive path and closing to reestablish electrical continuity in the phase conductive path, between said line and load sides. The neutral conductive path also includes a plurality of contacts that are capable of opening to cause electrical discontinuity in the neutral conductive path and closing to reestablish electrical continuity in the neutral conductive path, between said line and load sides. In this configuration, the circuit interrupting portion causes the plurality of contacts of the phase and neutral conductive paths to open, and the reset portion causes the plurality of contacts of the phase and neutral conductive paths to close.

One embodiment for the circuit interrupting portion uses an electro-mechanical circuit interrupter to cause electrical discontinuity in the phase and neutral conductive paths, and sensing circuitry to sense the occurrence of the predetermined condition. For example, the electro-mechanical circuit interrupter include a coil assembly, a movable plunger attached to the coil assembly and a banger attached to the plunger. The movable plunger is responsive to energizing of the coil assembly, and movement of the plunger is translated to movement of said banger. Movement of the banger causes the electrical discontinuity in the phase and/or neutral conductive paths.

The circuit interrupting device may also include reset lockout portion that prevents the reestablishing of electrical continuity in either the phase or neutral conductive path or both conductive paths, unless the circuit interrupting portion is operating properly. That is, the reset lockout prevents resetting of the device unless the circuit interrupting portion is operating properly. In embodiments where the circuit interrupting device includes a reset lockout portion, the reset portion may be configured so that at least one reset contact is electrically connected to the sensing circuitry of the circuit interrupting portion, and that depression of a reset button causes at least a portion of the phase conductive path to contact at least one reset contact. When contact is made between the phase conductive path and the at least one reset contact, the circuit interrupting portion is activated so that the reset lockout portion is disabled and electrical continuity in the phase and neutral conductive paths can be reestablished.

The circuit interrupting device may also include a trip portion that operates independently of the circuit interrupting portion. The trip portion is disposed at least partially within the housing and is configured to cause electrical discontinuity in the phase and/or neutral conductive paths independent of the operation of the circuit interrupting portion. In one embodiment, the trip portion includes a trip actuator accessible from an exterior of the housing and a trip arm preferably within the housing and extending from the trip actuator. The trip arm is preferably configured to facilitate mechanical breaking of electrical continuity in the phase and/or neutral conductive paths, if the trip actuator is actuated. Preferably, the trip actuator is a button. However, other known actuators are also contemplated.

BRIEF DESCRIPTION OF THE DRAWINGS

Preferred embodiments of the present application are described herein with reference to the drawings in which similar elements are given similar reference characters, wherein:

FIG. 21 is a block diagram of a circuit interrupting system according to the present application.

DETAILED DESCRIPTION

Figure 1:
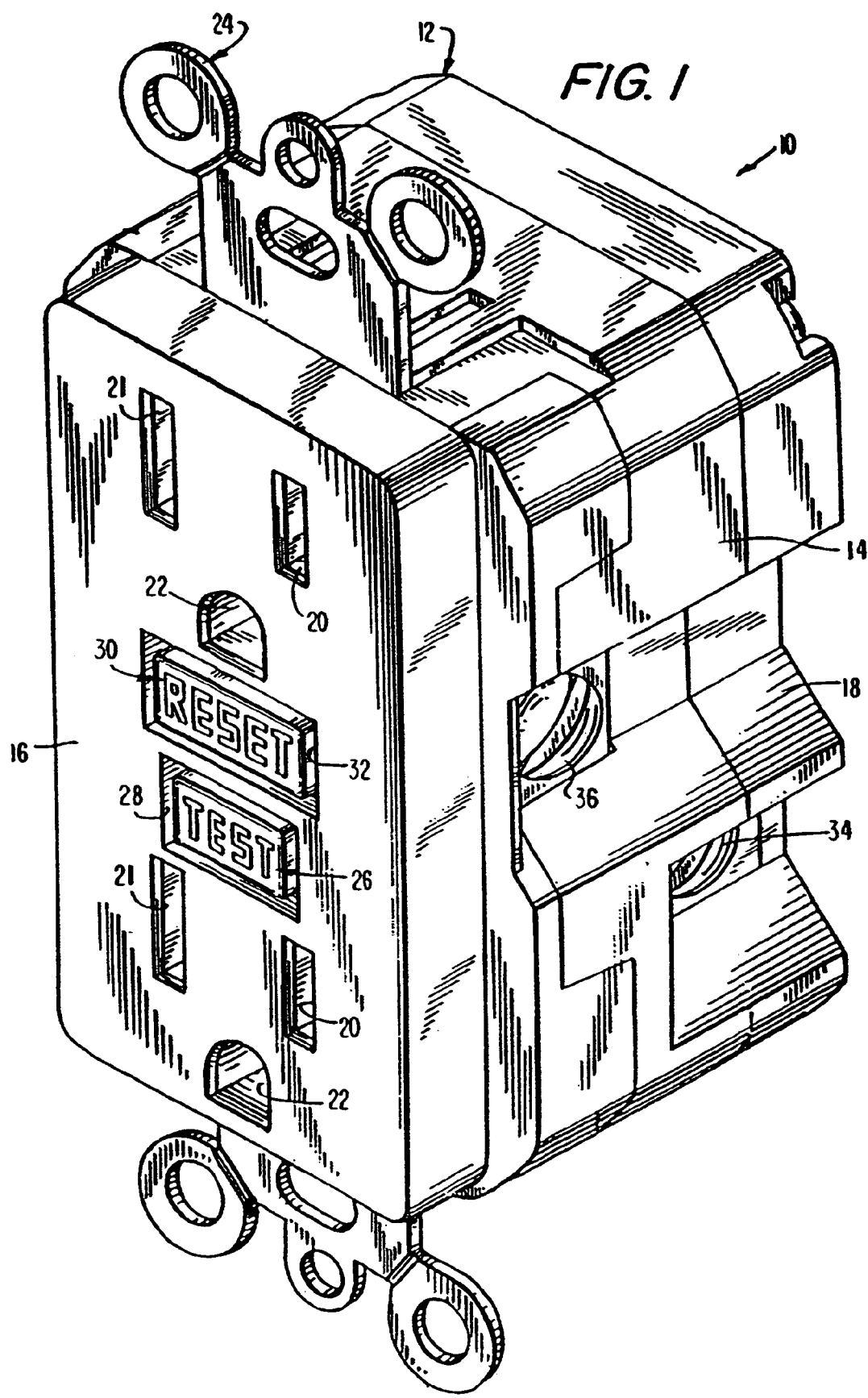
FIG. 1 is a perspective view of one embodiment of a ground fault circuit interrupting device according to the present application.

The present application contemplates various types of circuit interrupting devices that are capable of breaking at least one conductive path at both a line side and a load side of the device. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The GFCI receptacles described herein have line and load phase (or power) connections, line and load neutral connections and user accessible load phase and neutral connections. The connections permit external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

In one embodiment, the GFCI receptacle has a circuit interrupting portion, a reset portion and a reset lockout. This embodiment is shown in FIGS. 1–12. In another embodiment, the GFCI receptacle is similar to the embodiment of FIGS. 1–12, except the reset lockout is omitted. Thus, in this embodiment, the GFCI receptacle has a circuit interrupting portion and a reset portion, which is similar to those described in FIGS. 1–12. In another embodiment, the GFCI receptacle has a circuit interrupting portion, a reset portion, a reset lockout and an independent trip portion. This embodiment is shown in FIGS. 13–20.

The circuit interrupting and reset portions described herein preferably use electro-mechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths.

In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if the circuit interrupting portion is non-operational, if an open neutral condition exists and/or if the device is reverse wired.

In the embodiments including an independent trip portion, electrical continuity in one or more conductive paths can be broken independently of the operation of the circuit interrupting portion. Thus, in the event the circuit interrupting portion is not operating properly, the device can still be tripped.

The above-described features can be incorporated in any resettable circuit interrupting device, but for simplicity the descriptions herein are directed to GFCI receptacles.

Turning now to FIG. 1, the GFCI receptacle 10 has a housing 12 consisting of a relatively central body 14 to which a face or cover portion 16 and a rear portion 18 are removably secured. The face portion 16 has entry ports 20 and 21 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A test button 26 extends through opening 28 in the face portion 16 of the housing 12. The test button is used to activate a test operation, that tests the operation of the circuit interrupting portion (or circuit interrupter) disposed in the device. The circuit interrupting portion, to be described in more detail below, is used to break electrical continuity in one or more conductive paths between the line and load side of the device. A reset button 30 forming a part of the reset portion extends through opening 32 in the face portion 16 of the housing 12. The reset button is used to activate a reset operation, which reestablishes electrical continuity in the open conductive paths.

Electrical connections to existing household electrical wiring are made via binding screws 34 and 36, where screw 34 is an input (or line) phase connection, and screw 36 is an output (or load) phase connection. It should be noted that two additional binding screws 38 and 40 (seen in FIG. 3) are located on the opposite side of the receptacle 10. These additional binding screws provide line and load neutral connections, respectively. A more detailed description of a GFCI receptacle is provided in U.S. Pat. No. 4,595,894, which is incorporated herein in its entirety by reference. It should also be noted that binding screws 34, 36, 38 and 40 are exemplary of the types of wiring terminals that can be used to provide the electrical connections. Examples of other types of wiring terminals include set screws, pressure clamps, pressure plates, push-in type connections, pigtails and quick-connect tabs.

Referring to FIGS. 2–6, the conductive path between the line phase connection 34 and the load phase connection 36 includes contact arm 50 which is movable between stressed and unstressed positions, movable contact 52 mounted to the contact arm 50, contact arm 54 secured to or monolithically formed into the load phase connection 36 and fixed contact 56 mounted to the contact arm 54. The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74. The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 2:
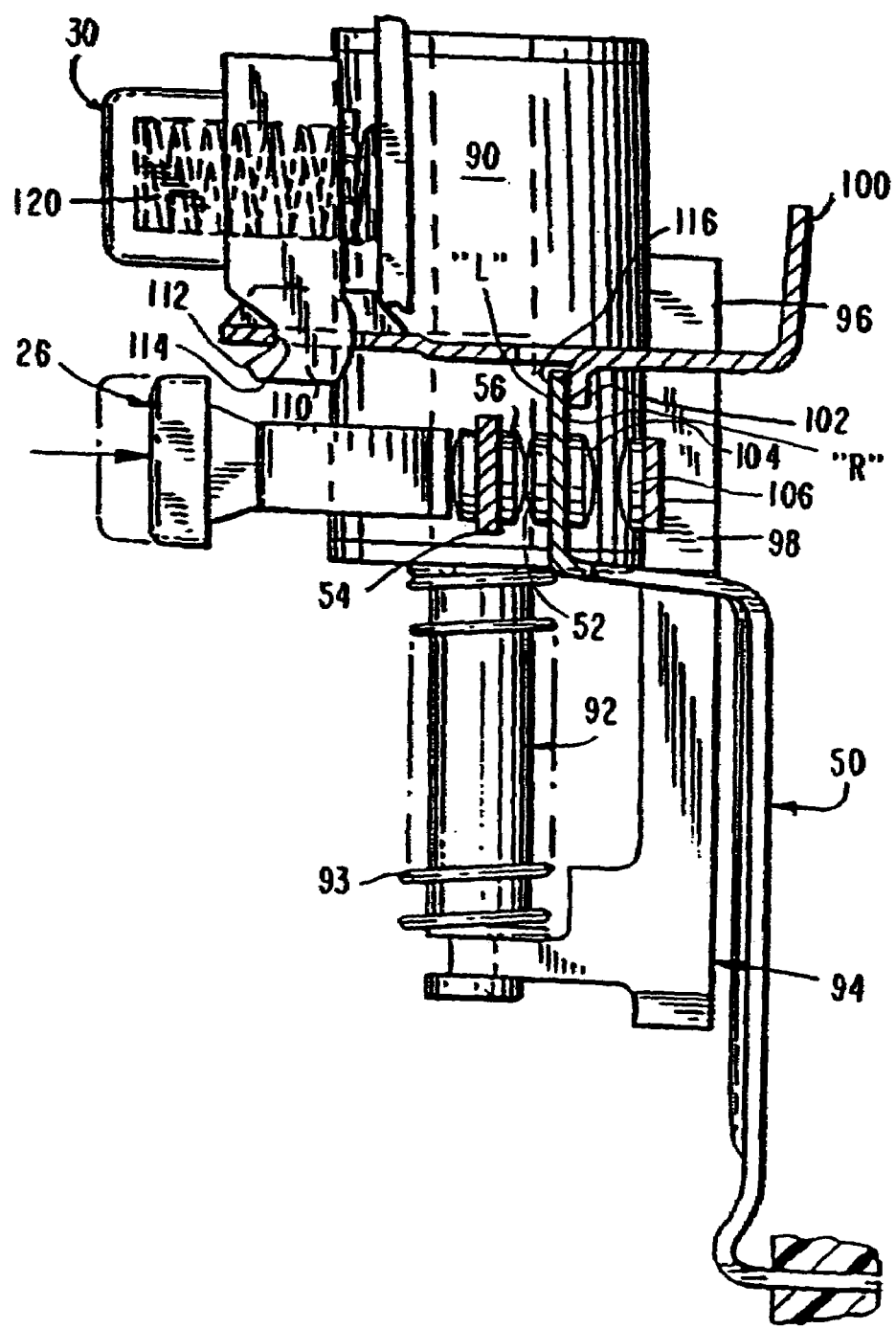
FIG. 2 is side elevational view, partly in section, of a portion of the GFCI device shown in FIG. 1, illustrating the GFCI device in a set or circuit making position.
Figure 12:
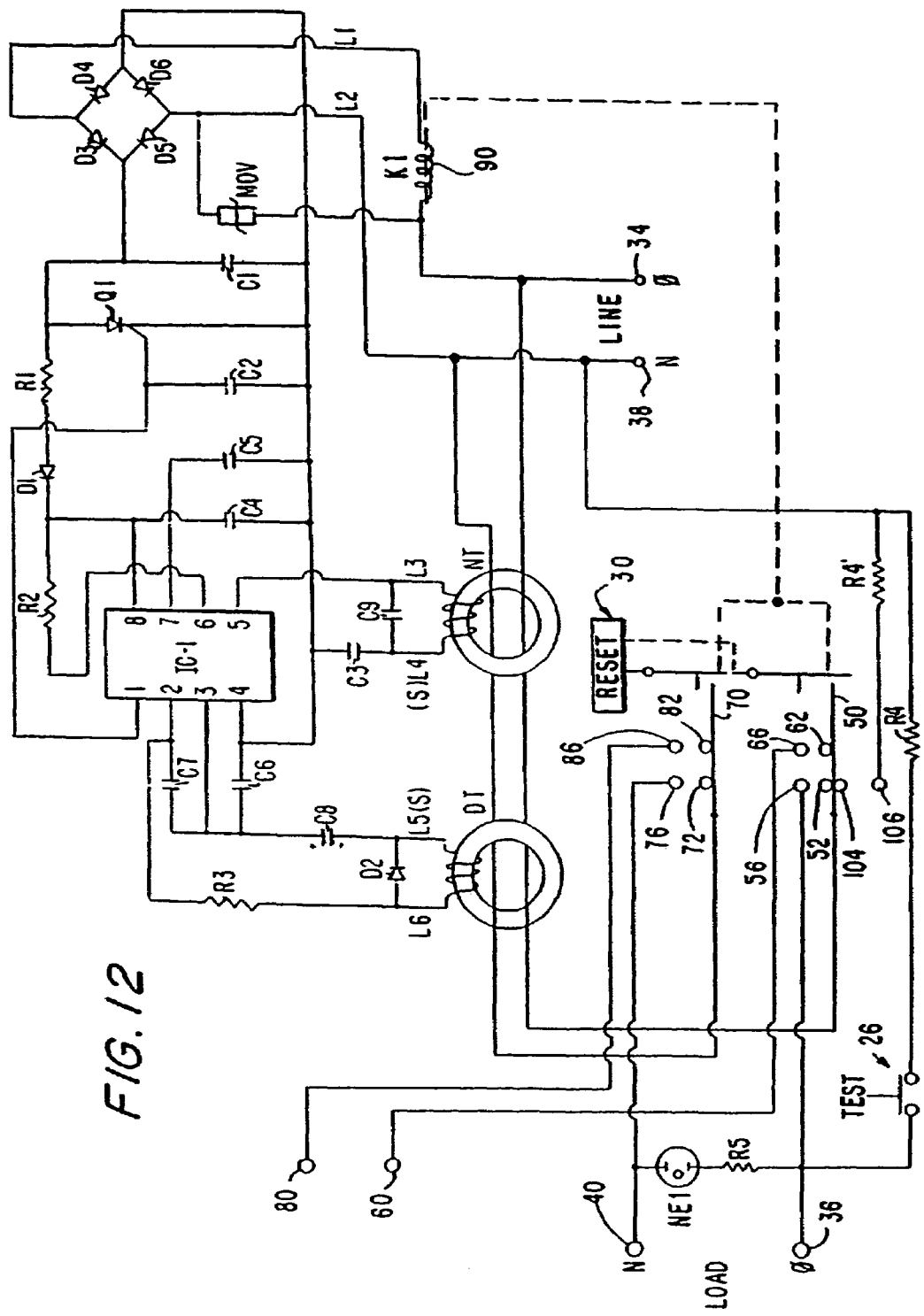
FIG. 12 is a schematic diagram of a circuit for detecting ground faults and resetting the GFCI device of FIG. 1.

Referring to FIG. 2, the circuit interrupting portion has a circuit interrupter and electronic circuitry capable of sensing faults, e.g., current imbalances, on the hot and/or neutral conductors. In a preferred embodiment for the GFCI receptacle, the circuit interrupter includes a coil assembly 90, a plunger 92 responsive to the energizing and de-energizing of the coil assembly and a banger 94 connected to the plunger 92. The banger 94 has a pair of banger dogs 96 and 98 which interact with a movable latching members 100 used to set and reset electrical continuity in one or more conductive paths. The coil assembly 90 is activated in response to the sensing of a ground fault by, for example, the sense circuitry shown in FIG. 12. FIG. 12 shows conventional circuitry for detecting ground faults that includes a differential transformer that senses current imbalances.

The reset portion includes reset button 30, the movable latching members 100 connected to the reset button 30, latching fingers 102 and reset contacts 104 and 106 that temporarily activate the circuit interrupting portion when the reset button is depressed, when in the tripped position. Preferably, the reset contacts 104 and 106 are normally open momentary contacts. The latching fingers 102 are used to engage side R of each contact arm 50,70 and move the arms 50,70 back to the stressed position where contacts 52,62 touch contacts 56,66, respectively, and where contacts 72,82 touch contacts 76,86, respectively.

The movable latching members 102 are, in this embodiment, common to each portion (i.e., the circuit interrupting, reset and reset lockout portions) and used to facilitate making, breaking or locking out of electrical continuity of one or more of the conductive paths. However, the circuit interrupting devices according to the present application also contemplate embodiments where there is no common mechanism or member between each portion or between certain portions. Further, the present application also contemplates using circuit interrupting devices that have circuit interrupting, reset and reset lockout portions to facilitate making, breaking or locking out of the electrical continuity of one or both of the phase or neutral conductive paths.

Figure 3:
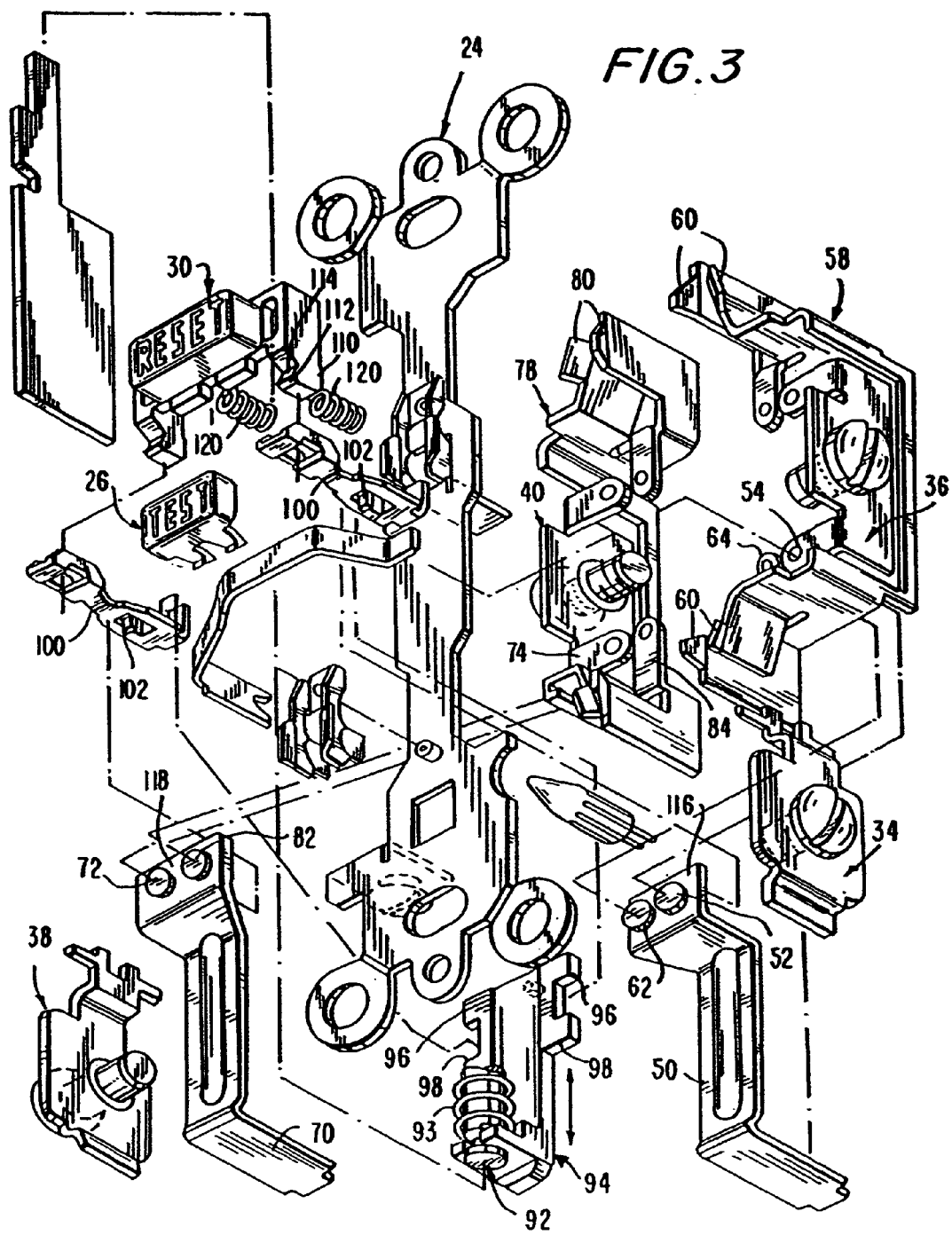
FIG. 3 is an exploded view of internal components of the circuit interrupting device of FIG. 1.

In the embodiment shown in FIGS. 2 and 3, the reset lockout portion includes latching fingers 102 which after the device is tripped, engages side L of the movable arms 50,70 so as to block the movable arms 50,70 from moving. By blocking movement of the movable arms 50,70, contacts 52 and 56, contacts 62 and 66, contacts 72 and 76 and contacts 82 and 86 are prevented from touching. Alternatively, only one of the movable arms 50 or 70 may be blocked so that their respective contacts are prevented from touching. Further, in this embodiment, latching fingers 102 act as an active inhibitor that prevents the contacts from touching. Alternatively, the natural bias of movable arms 50 and 70 can be used as a passive inhibitor that prevents the contacts from touching.

Referring now to FIGS. 2 and 7–11, the mechanical components of the circuit interrupting and reset portions in various stages of operation are shown. For this part of the description, the operation will be described only for the phase conductive path, but the operation is similar for the neutral conductive path, if it is desired to open and close both conductive paths. In FIG. 2, the GFCI receptacle is shown in a set position where movable contact arm 50 is in a stressed condition so that movable contact 52 is in electrical engagement with fixed contact 56 of contact arm 54. If the sensing circuitry of the GFCI receptacle senses a ground fault, the coil assembly 90 is energized to draw plunger 92 into the coil assembly 90 so that banger 94 moves upwardly. As the banger moves upwardly, the banger front dog 98 strikes the latch member 100 causing it to pivot in a counterclockwise direction C (seen in FIG. 7) about the joint created by the top edge 112 and inner surface 114 of finger 110. The movement of the latch member 100 removes the latching finger 102 from engagement with side R of the remote end 116 of the movable contact arm 50, and permits the contact arm 50 to return to its pre-stressed condition opening contacts 52 and 56, seen in FIG. 7.

Figure 10:
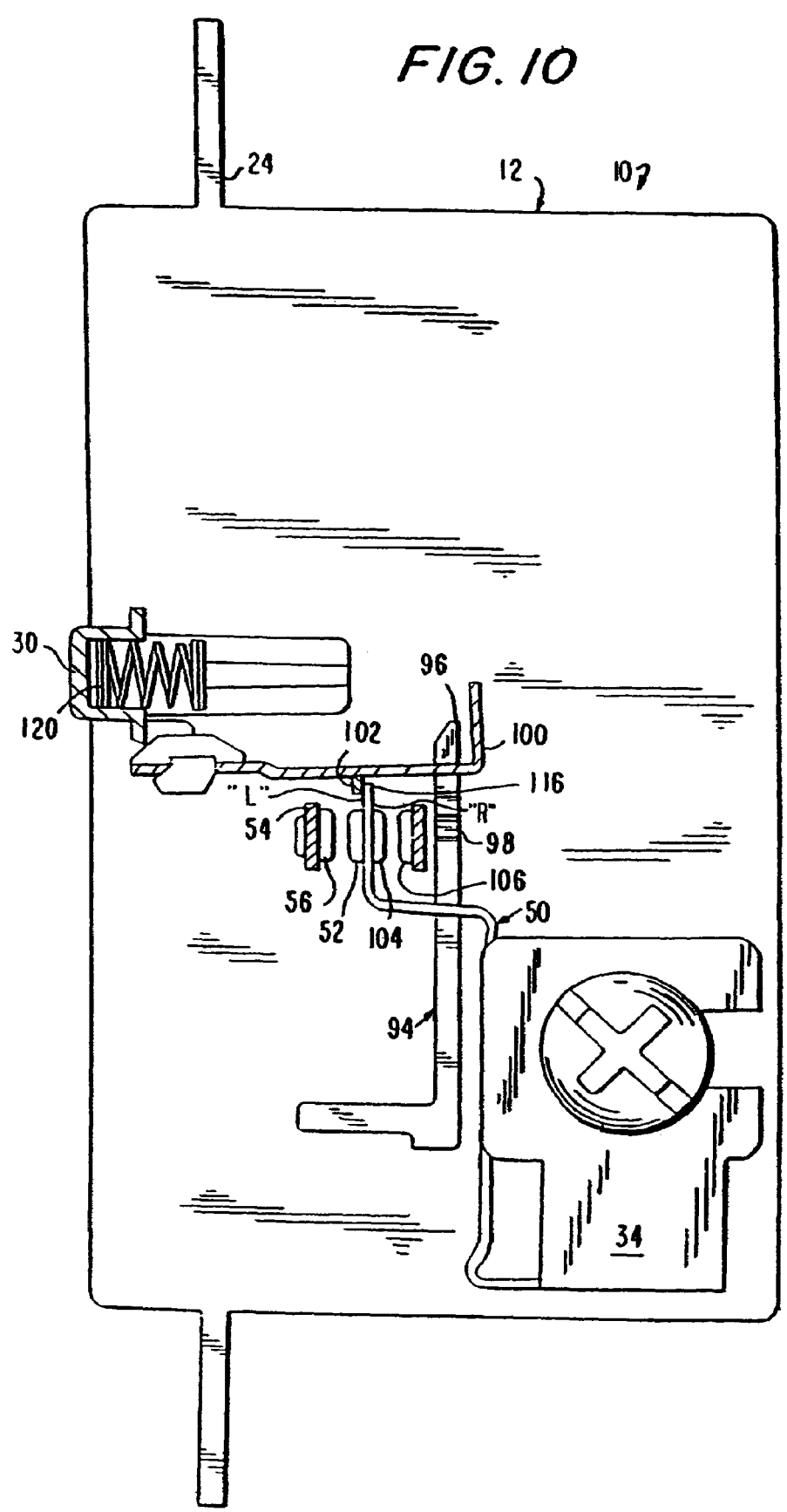

After tripping, the coil assembly 90 is de-energized so that spring 93 returns plunger 92 to its original extended position and banger 94 moves to its original position releasing latch member 100. At this time, the latch member 100 is in a lockout position where latch finger 102 inhibits movable contact 52 from engaging fixed contact 56, as seen in FIG. 10. As noted, one or both latching fingers 102 can act as an active inhibitor that prevents the contacts from touching. Alternatively, the natural bias of movable arms 50 and 70 can be used as a passive inhibitor that prevents the contacts from touching.

Figure 7:
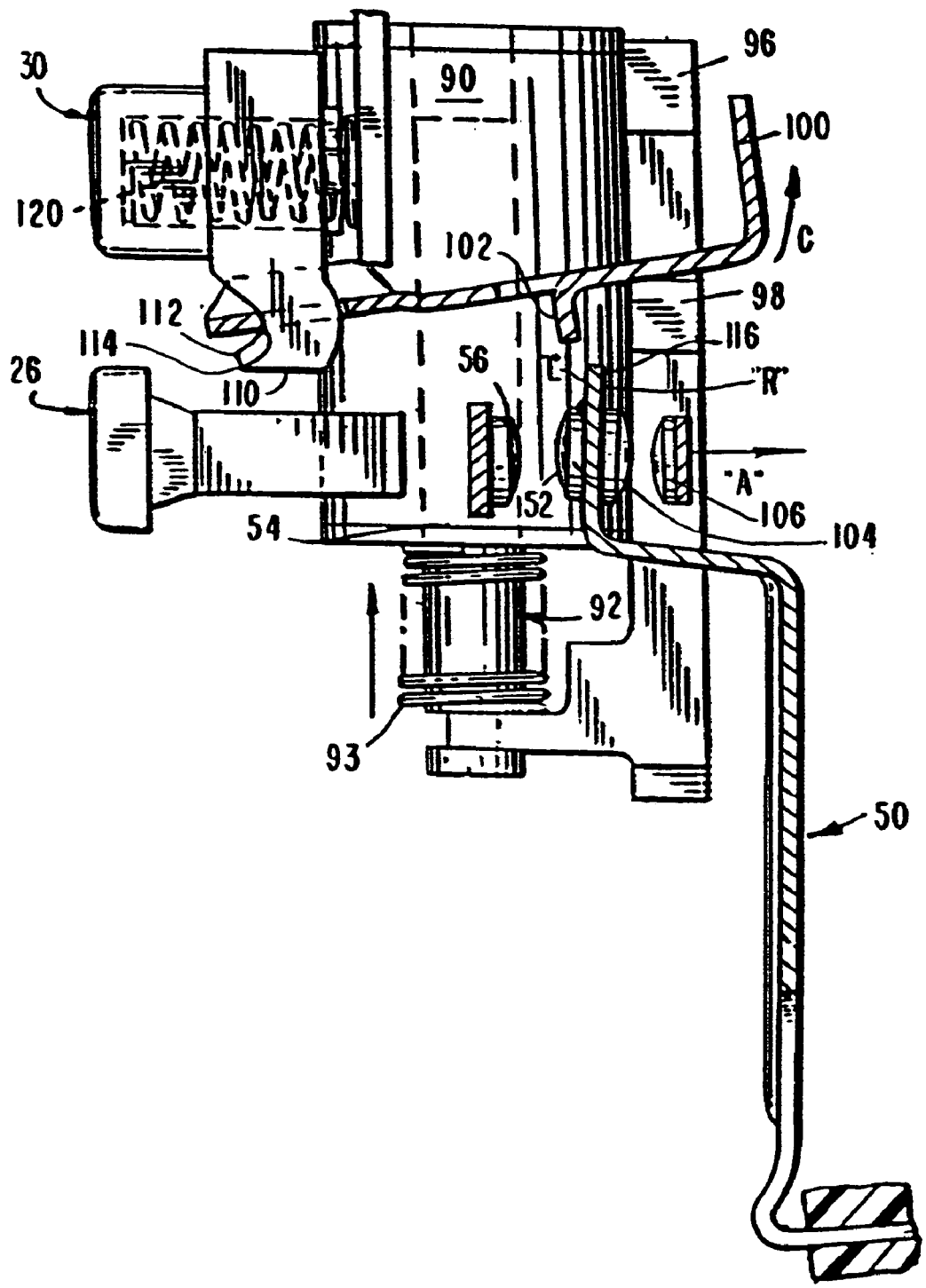
FIG. 7 is a side elevational view similar to FIG. 2, illustrating the GFCI device in a circuit breaking or interrupting position.
Figure 8:
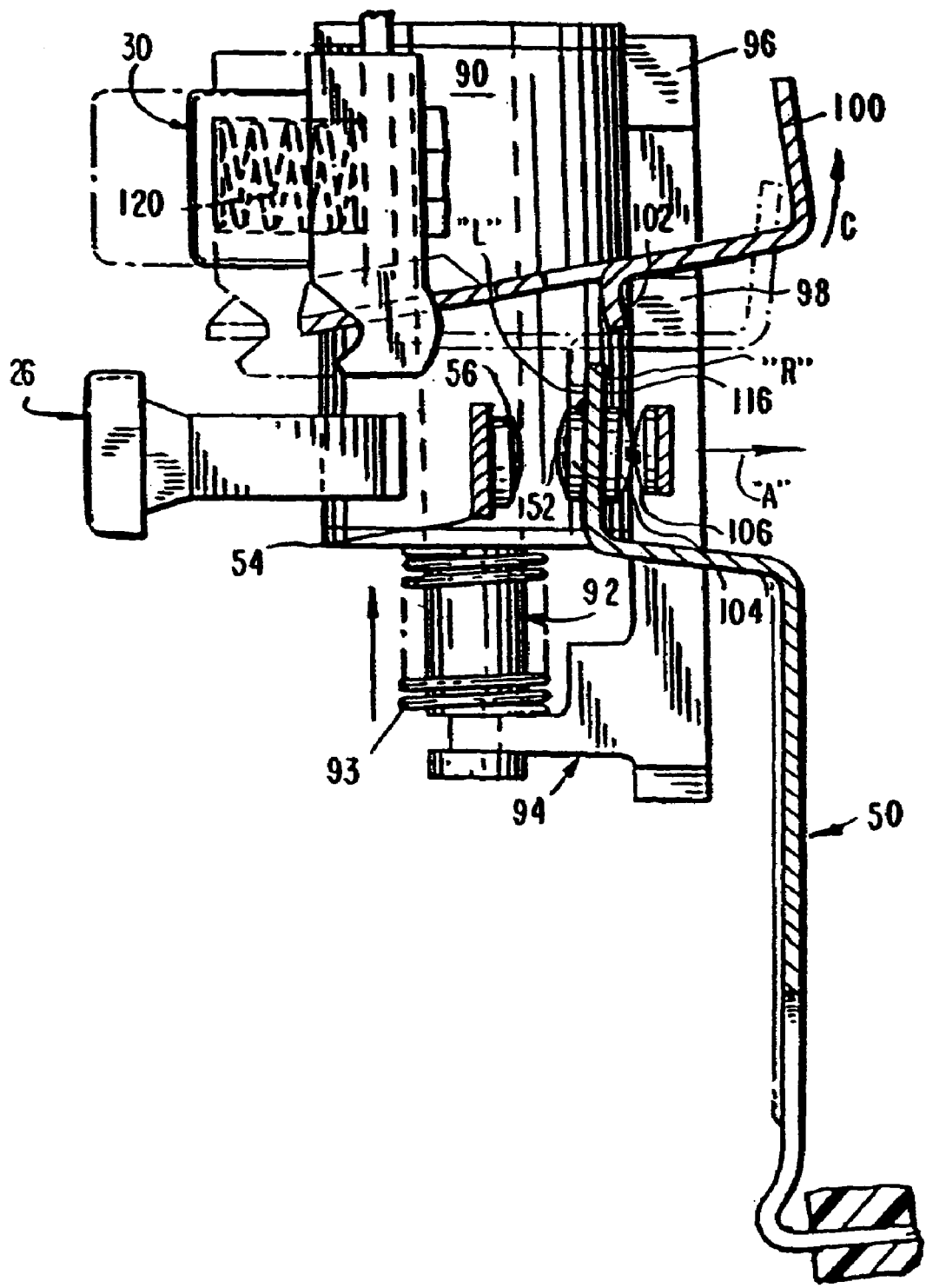
FIG. 8 is a side elevational view similar to FIG. 2, illustrating the components of the GFCI device during a reset operation.
Figure 11:
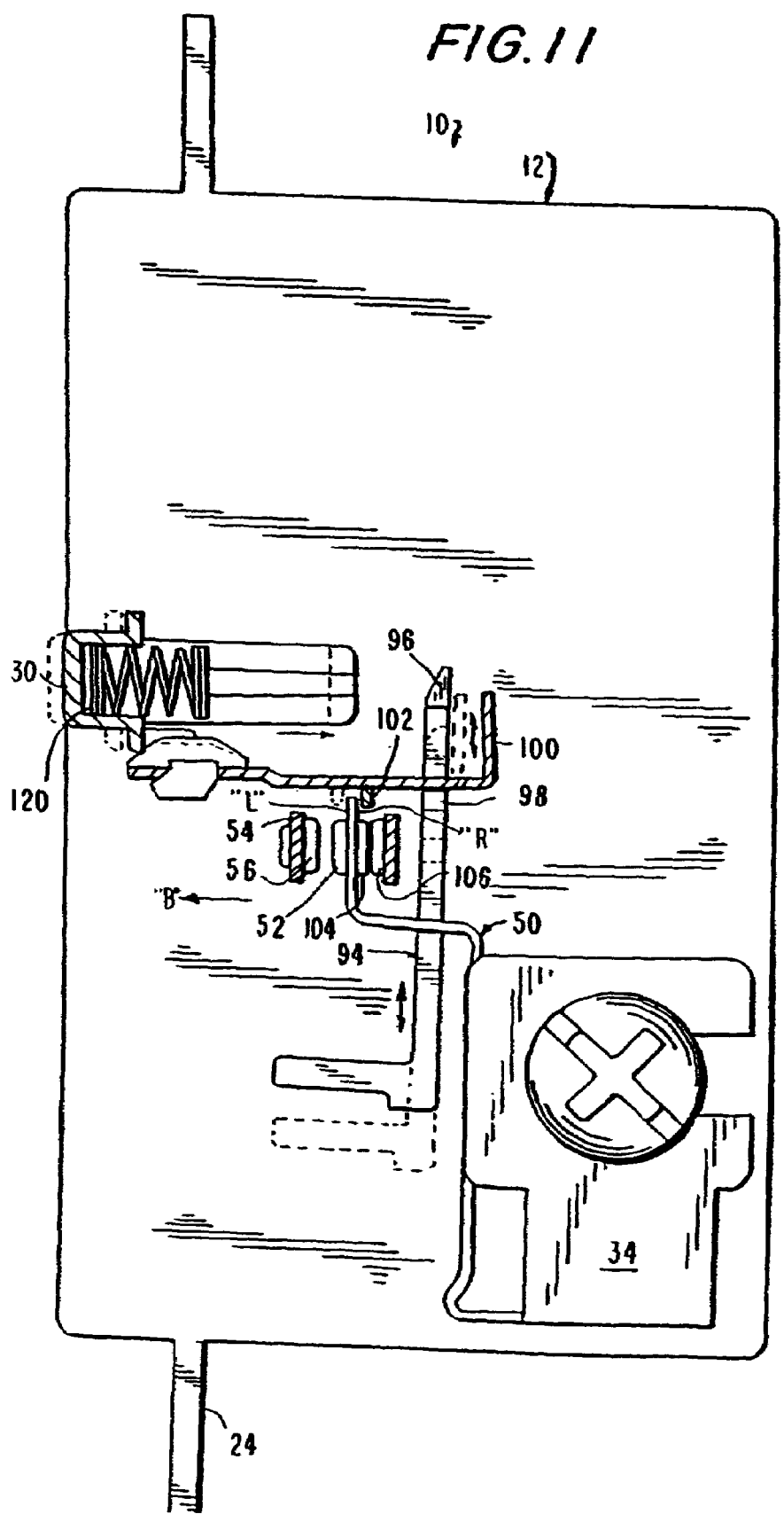

To reset the GFCI receptacle so that contacts 52 and 56 are closed and continuity in the phase conductive path is reestablished, the reset button 30 is depressed sufficiently to overcome the bias force of return spring 120 and move the latch member 100 in the direction of arrow A, seen in FIG. 8. While the reset button 30 is being depressed, latch finger 102 contacts side L of the movable contact arm 50 and continued depression of the reset button 30 forces the latch member to overcome the stress force exerted by the arm 50 causing the reset contact 104 on the arm 50 to close on reset contact 106. Closing the reset contacts activates the operation of the circuit interrupter by, for example simulating a fault, so that plunger 92 moves the banger 94 upwardly striking the latch member 100 which pivots the latch finger 102, while the latch member 100 continues to move in the direction of arrow A. As a result, the latch finger 102 is lifted over side L of the remote end 116 of the movable contact arm 50 onto side R of the remote end of the movable contact arm, as seen in FIGS. 7 and 11. Contact arm 50 returns to its unstressed position, opening contacts 52 and 56 and contacts 62 and 66, so as to terminate the activation of the circuit interrupting portion, thereby de-energizing the coil assembly 90.

Figure 9:
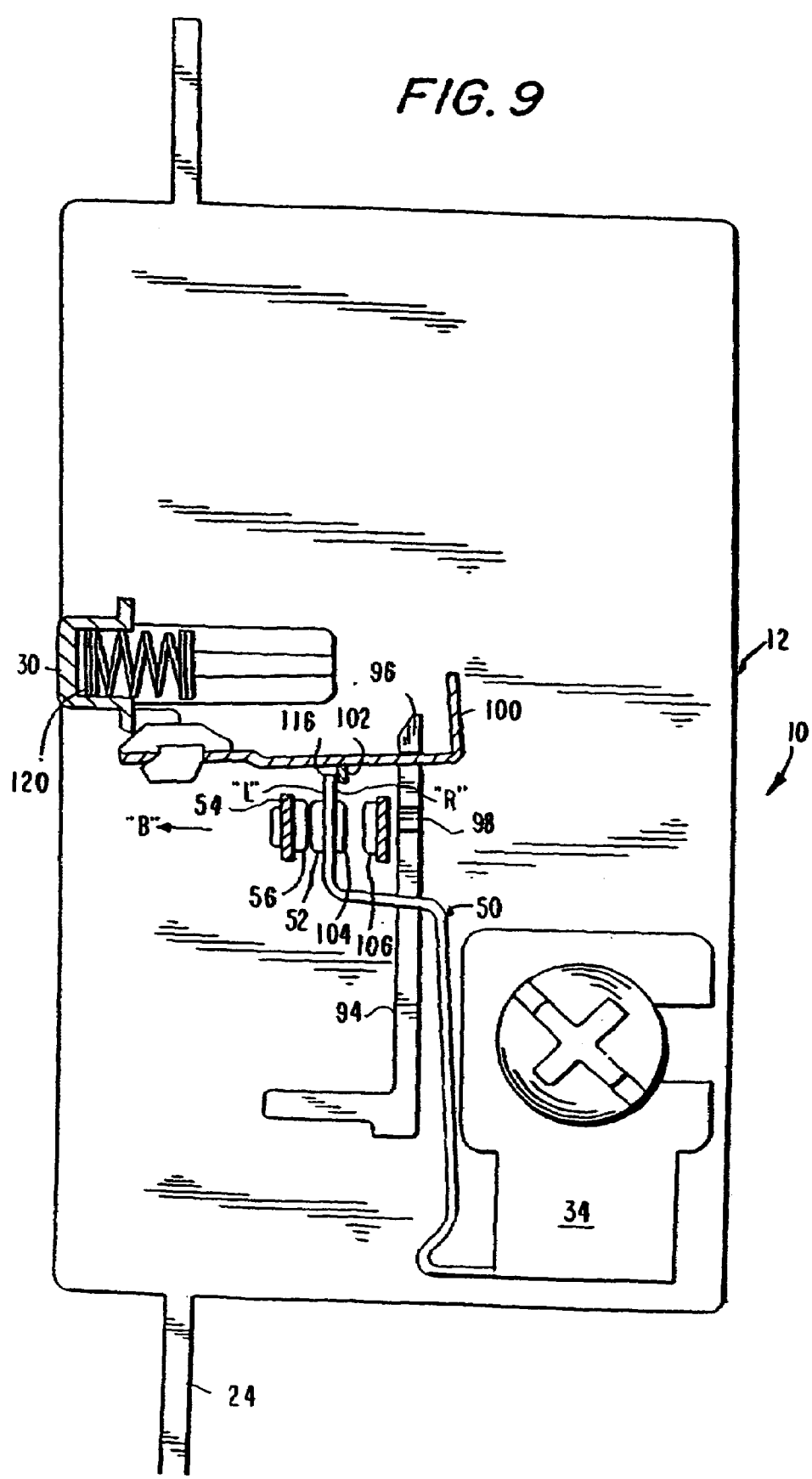
FIGS. 9–11 are schematic representations of the operation of one embodiment of the reset portion of the present application, illustrating a latching member used to make an electrical connection between line and load connections and to relate the reset portion of the electrical connection with the operation of the circuit interrupting portion.

After the circuit interrupter operation is activated, the coil assembly 90 is de-energized so that so that plunger 92 returns to its original extended position, and banger 94 releases the latch member 100 so that the latch finger 102 is in a reset position, seen din FIG. 9. Release of the reset button causes the latching member 100 and movable contact arm 50 to move in the direction of arrow B (seen in FIG. 9) until contact 52 electrically engages contact 56, as seen in FIG. 2.

As noted above, if opening and closing of electrical continuity in the neutral conductive path is desired, the above description for the phase conductive path is also applicable to the neutral conductive path.

In an alternative embodiment, the circuit interrupting devices may also include a trip portion that operates independently of the circuit interrupting portion so that in the event the circuit interrupting portion becomes non-operational the device can still be tripped. Preferably, the trip portion is manually activated and uses mechanical components to break one or more conductive paths. However, the trip portion may use electrical circuitry and/or electro-mechanical components to break either the phase or neutral conductive path or both paths.

For the purposes of the present application, the structure or mechanisms for this embodiment are also incorporated into a GFCI receptacle, seen in FIGS. 13–20, suitable for installation in a single-gang junction box in a home. However, the mechanisms according to the present application can be included in any of the various devices in the family of resettable circuit interrupting devices.

Figure 13:
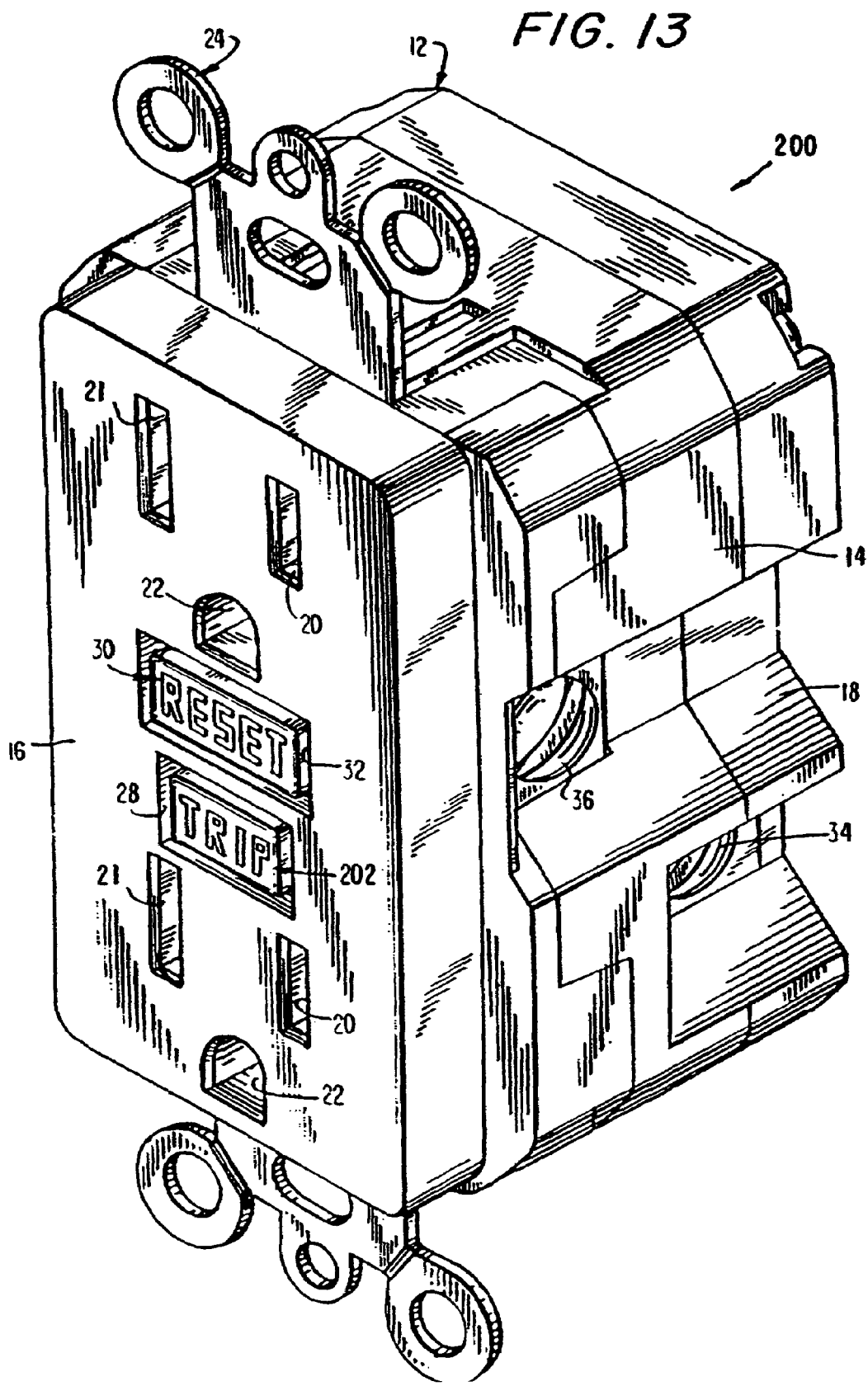
FIG. 13 is a perspective view of an alternative embodiment of a ground fault circuit interrupting device according to the present application.

Turning now to FIG. 13, the GFCI receptacle 200 according to this embodiment is similar to the GFCI receptacle described in FIGS. 1–12. Similar to FIG. 1, the GFCI receptacle 200 has a housing 12 consisting of a relatively central body 14 to which a face or cover portion 16 and a rear portion 18 are, preferably, removably secured.

A trip actuator 202, preferably a button, which is part of the trip portion to be described in more detail below, extends through opening 28 in the face portion 16 of the housing 12. The trip actuator is used, in this exemplary embodiment, to mechanically trip the GFCI receptacle, i.e., break electrical continuity in one or more of the conductive paths, independent of the operation of the circuit interrupting portion.

A reset actuator 30, preferably a button, which is part of the reset portion, extends through opening 32 in the face portion 16 of the housing 12. The reset button is used to activate the reset operation, which re-establishes electrical continuity in the open conductive paths, i.e., resets the device, if the circuit interrupting portion is operational.

As in the above embodiment, electrical connections to existing household electrical wiring are made via binding screws 34 and 36, where screw 34 is an input (or line) phase connection, and screw 36 is an output (or load) phase connection. It should be noted that two additional binding-screws 38 and 40 (seen in FIG. 3) are located on the opposite side of the receptacle 200. These additional binding screws provide line and load neutral connections, respectively. A more detailed description of a GFCI receptacle is provided in U.S. Pat. No. 4,595,894, which is incorporated herein in its entirety by reference.

Referring to FIGS. 4–6, 14 and 17, the conductive paths in this embodiment are substantially the same as those described above. The conductive path between the line phase connection 34 and the load phase connection 36 includes, contact arm 50 which is movable between stressed and unstressed positions, movable contact 52 mounted to the contact arm 50, contact arm 54 secured to or monolithically formed into the load phase connection 36 and fixed contact 56 mounted to the contact arm 54 (seen in FIGS. 4, 5 and 17). The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Figure 4:
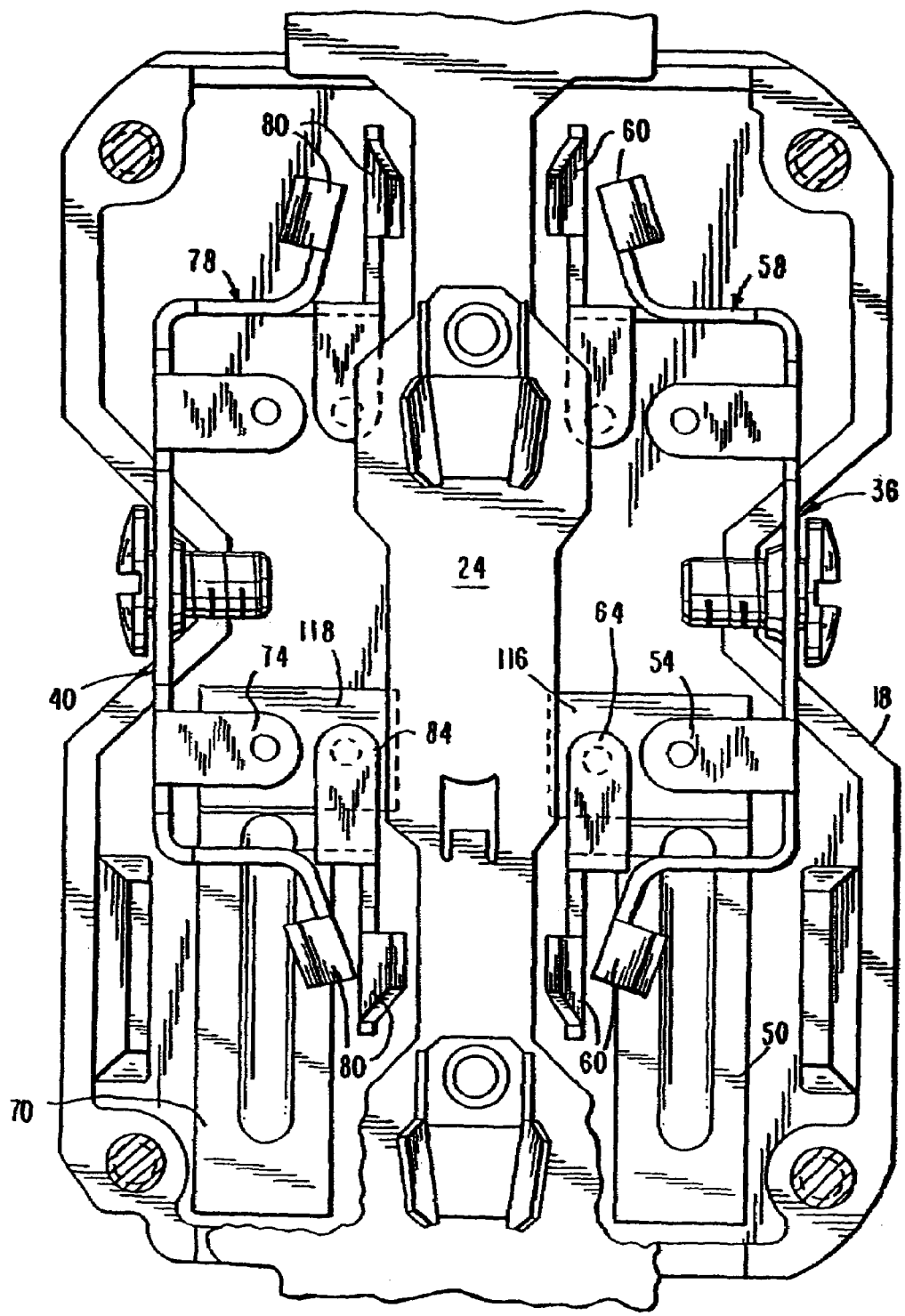
FIG. 4 is a plan view of portions of electrical conductive paths located within the GFCI device of FIG. 1.
Figure 5:
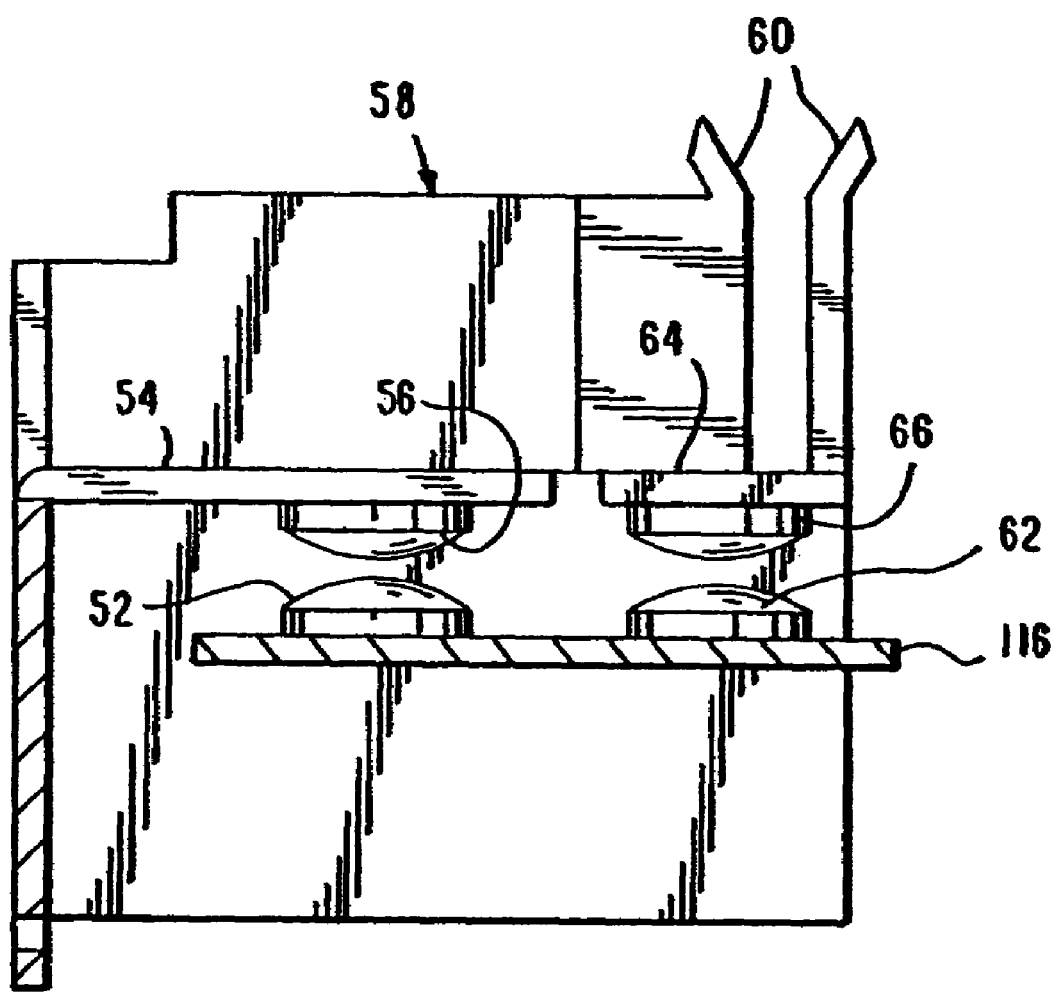
FIG. 5 is a partial sectional view of a portion of a conductive path shown in FIG. 4.
Figure 6:
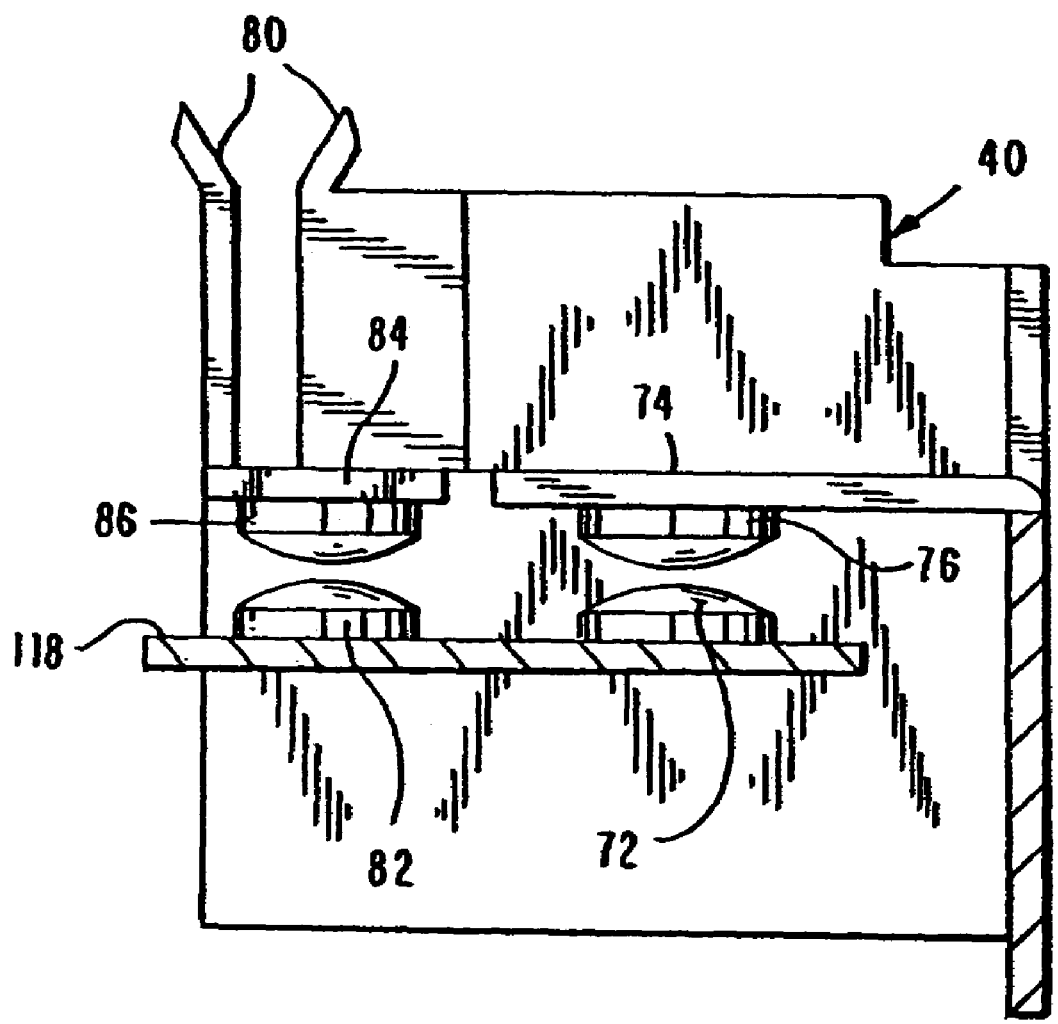
FIG. 6 is a partial sectional view of a portion of a conductive path shown in FIG. 4.
Figure 17:
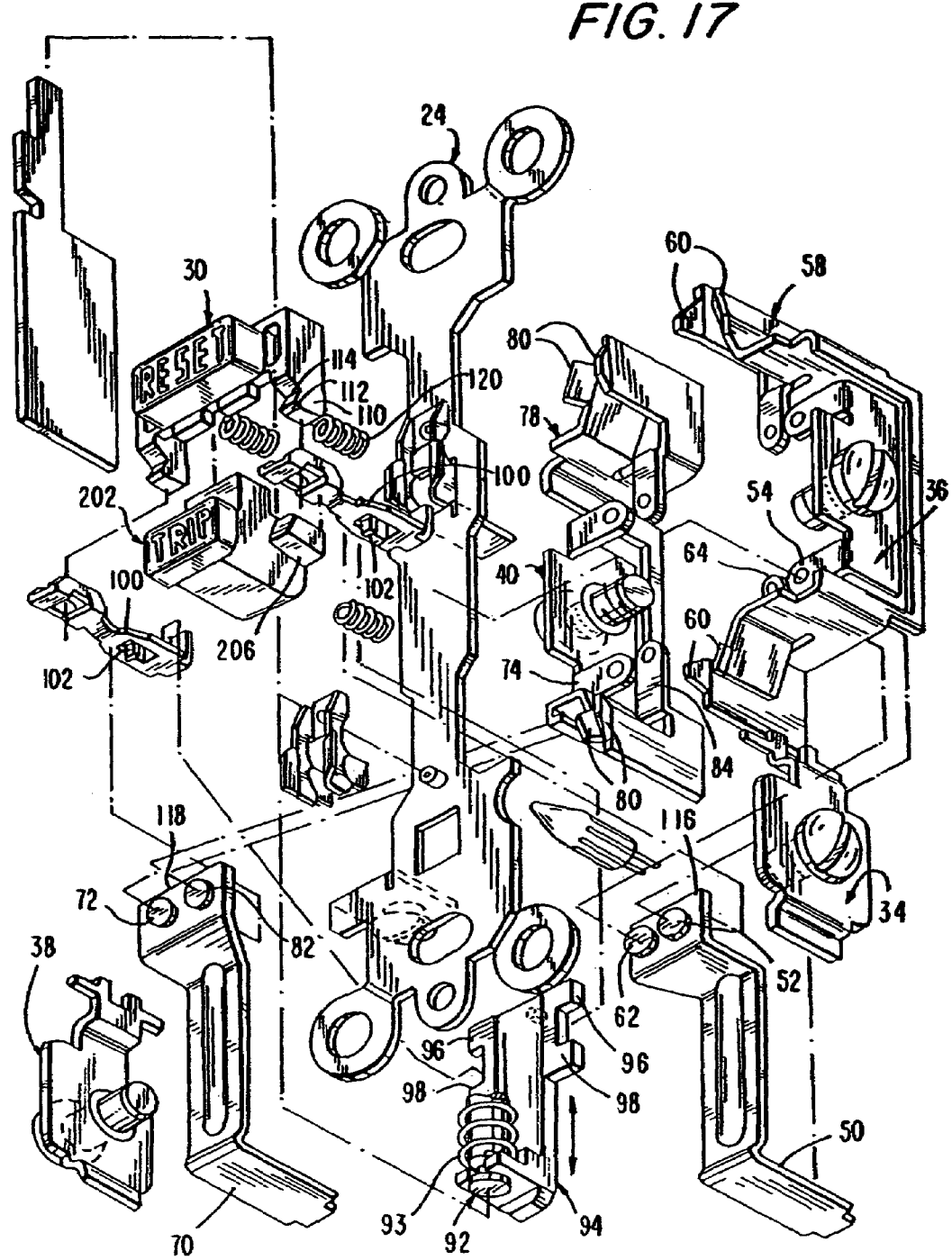
FIG. 17 is an exploded view of internal components of the GFCI device of FIG. 13.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74 (seen in FIGS. 4, 6 and 17). The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 14:
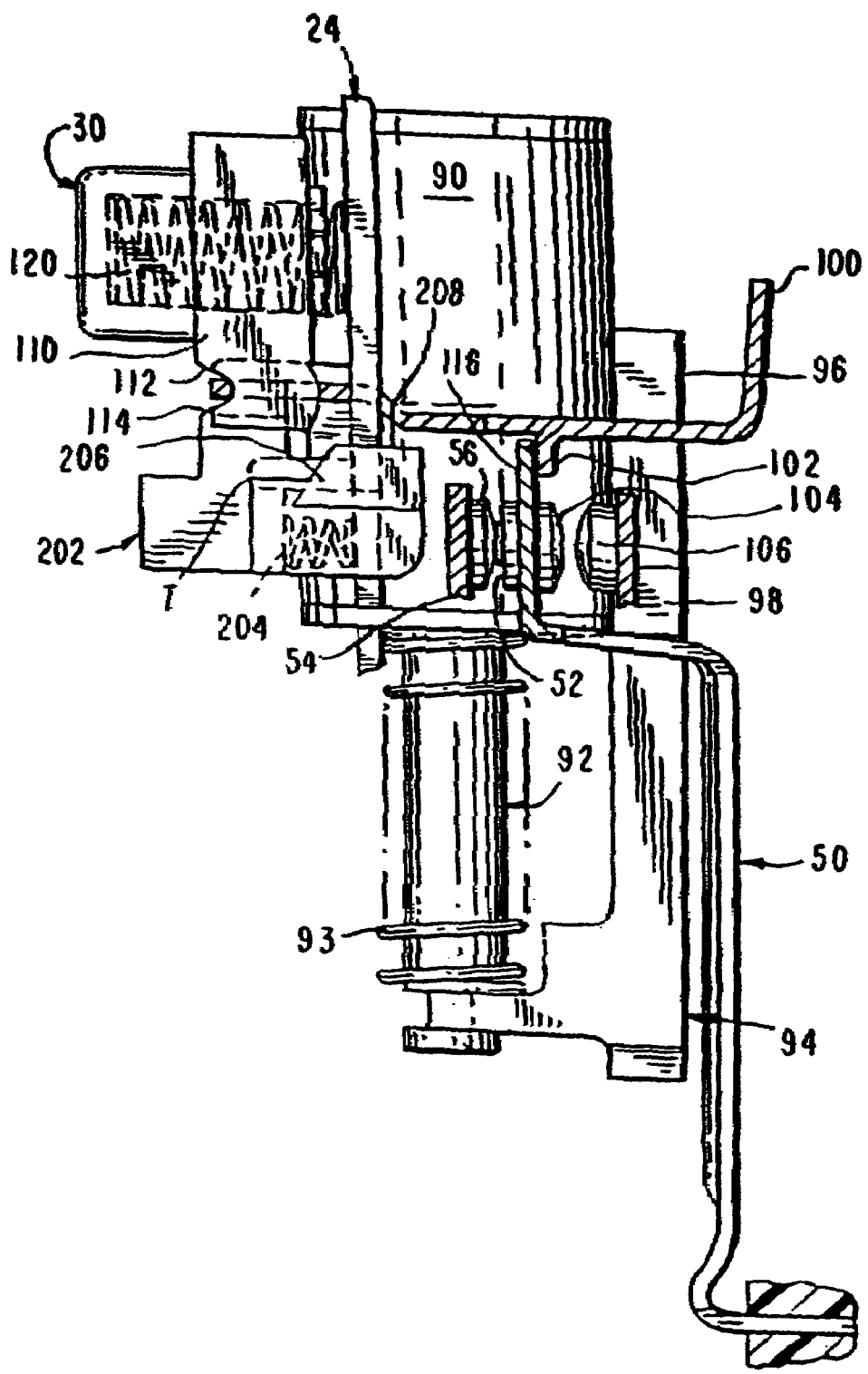
FIG. 14 is side elevational view, partly in section, of a portion of the GFCI device shown in FIG. 13, illustrating the GFCI device in a set or circuit making position.

There is also shown in FIG. 14, mechanical components used during circuit interrupting and reset operations according to this embodiment of the present application. Although these components shown in the drawings are electro-mechanical in nature, the present application also contemplates using semiconductor type circuit interrupting and reset components, as well as other mechanisms capable of making and breaking electrical continuity.

The circuit interrupting device according to this embodiment incorporates an independent trip portion into the circuit interrupting device of FIGS. 1–12. Therefore, a description of the circuit interrupting, reset and reset lockout portions are omitted.

Figure 15:
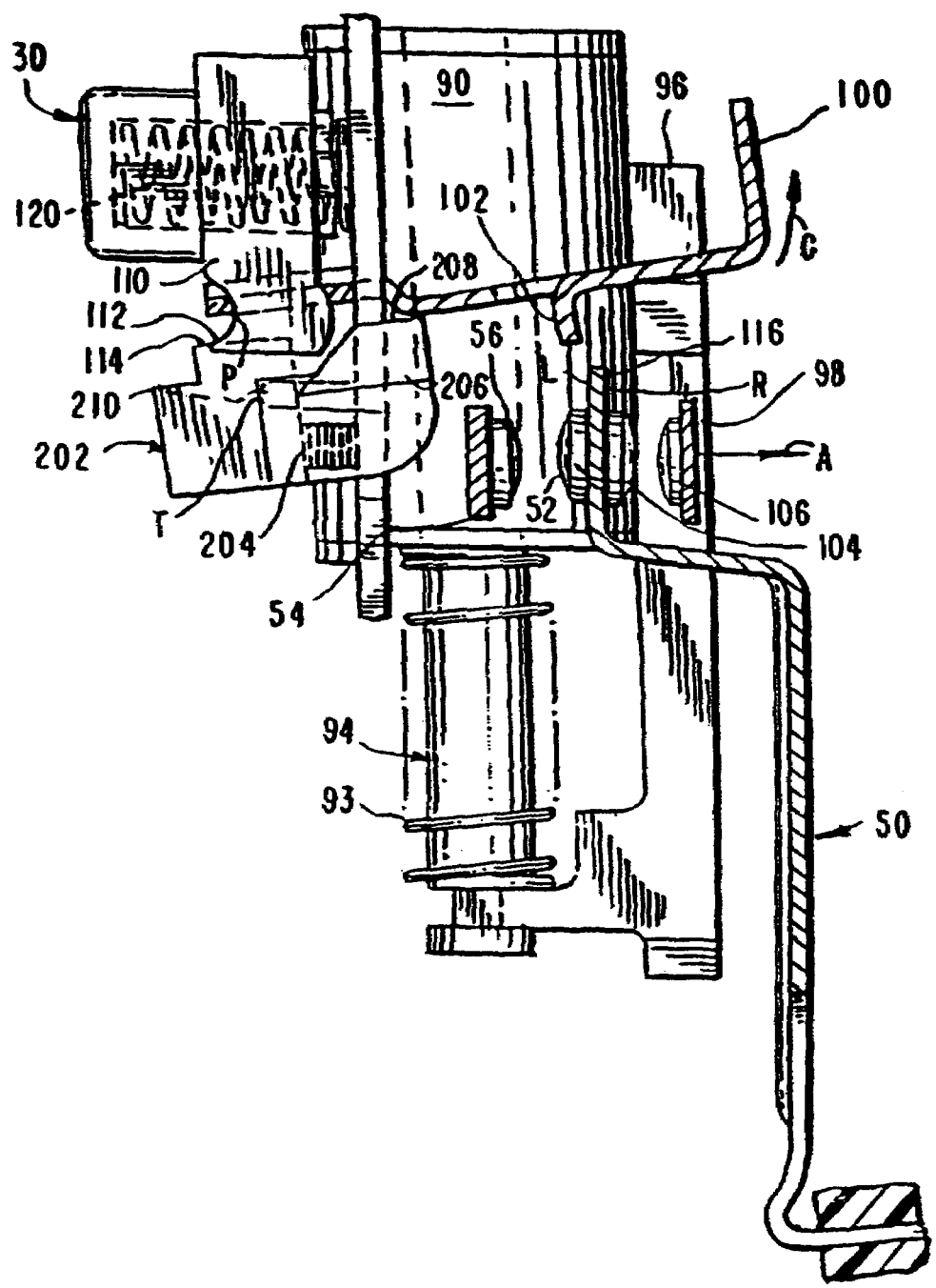
FIG. 15 is a side elevational view similar to FIG. 14, illustrating the GFCI device in a circuit breaking position.
Figure 16:
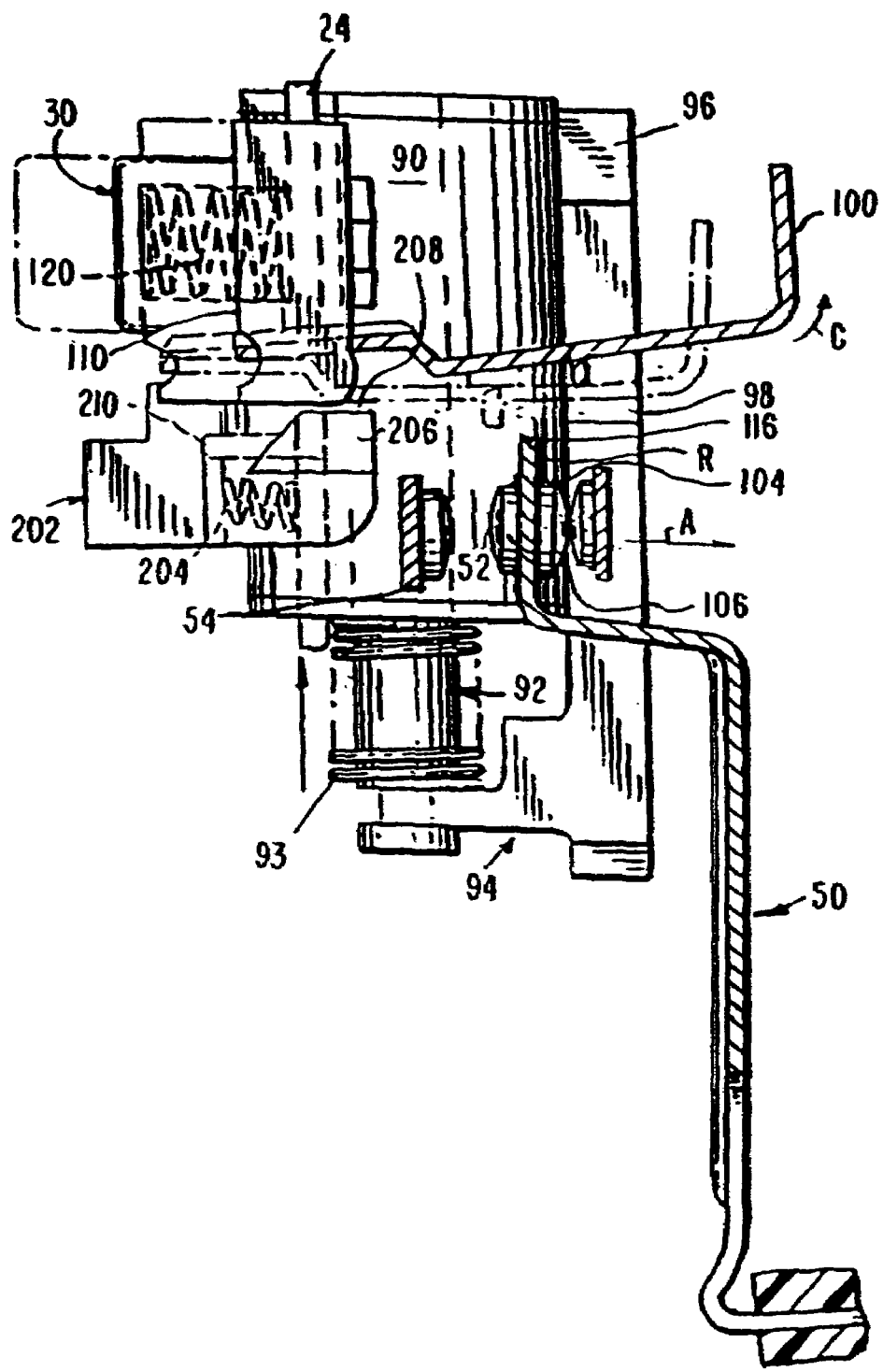
FIG. 16 is a side elevational view similar to FIG. 14, illustrating the components of the GFCI device during a reset operation.

Referring to FIGS. 14–16 an exemplary embodiment of the trip portion according to the present application includes a trip actuator 202, preferably a button, that is movable between a set position, where contacts 52 and 56 are permitted to close or make contact, as seen in FIG. 14, and a trip position where contacts 52 and 56 are caused to open, as seen in FIG. 15. Spring 204 normally biases trip actuator 202 toward the set position. The trip portion also includes a trip arm 206 that extends from the trip actuator 202 so that a surface 208 of the trip arm 206 moves into contact with the movable latching member 100, when the trip button is moved toward the trip position. When the trip actuator 202 is in the set position, surface 208 of trip arm 202 can be in contact with or close proximity to the movable latching member 100, as seen in FIG. 14.

Figure 18:
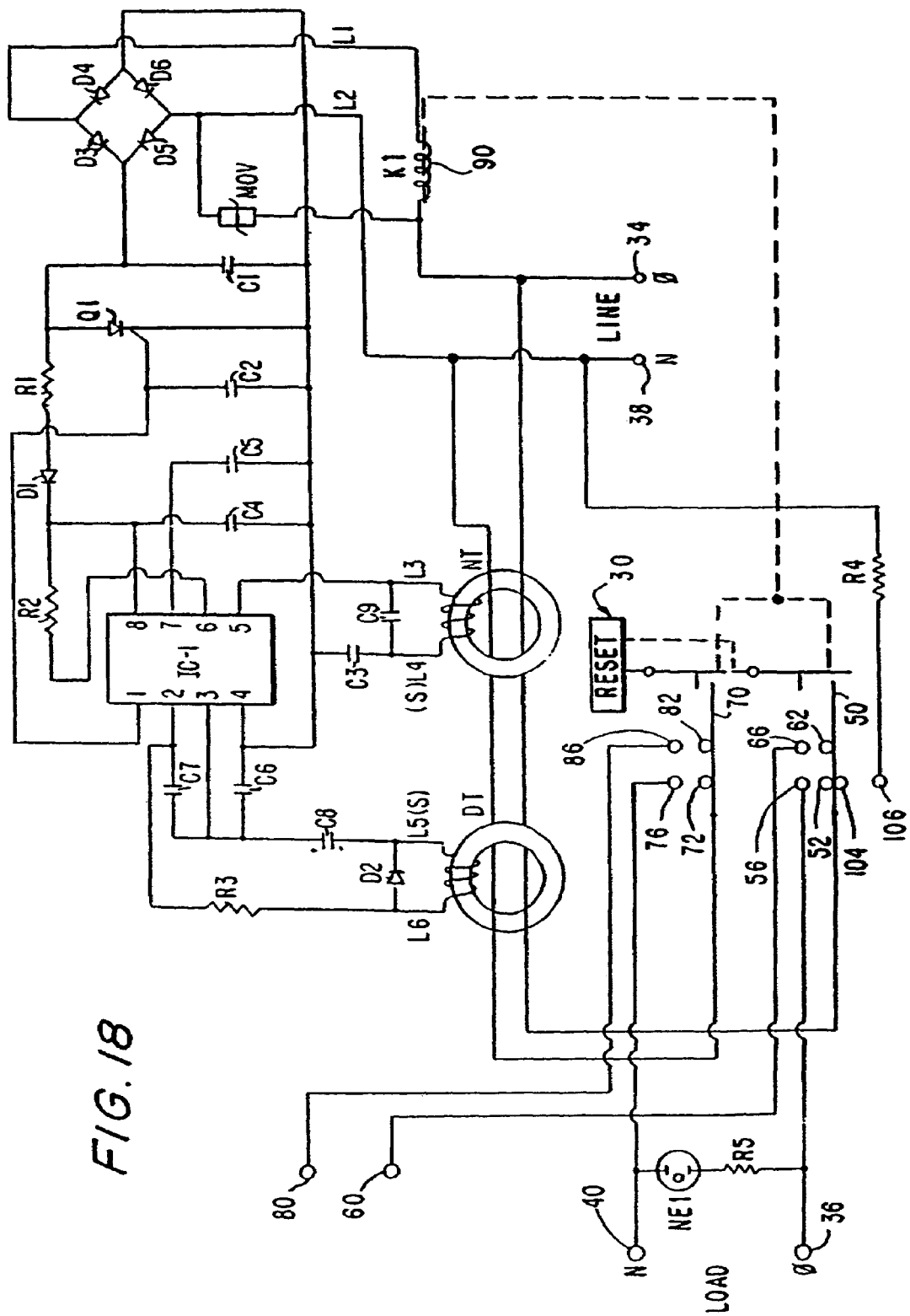
FIG. 18 is a schematic diagram of a circuit for detecting ground faults and resetting the GFCI device of FIG. 13.

In operation, upon depression of the trip actuator 202, the trip actuator pivots about point T of pivot arm 210 (seen in FIG. 15) extending from strap 24 so that the surface 208 of the trip arm 206 can contact the movable latching member 100. As the trip actuator 202 is moved toward the trip position, trip arm 206 also enters the path of movement of the finger 110 associated with reset button 30 thus blocking the finger 102 from further movement in the direction of arrow A (seen in FIG. 15). By blocking the movement of the finger 110, the trip arm 206 inhibits the activation of the reset operation and, thus, inhibits simultaneous activation of the trip and reset operations. Further depression of the trip actuator 202 causes the movable latching member 100 to pivot about point T in the direction of arrow C (seen in FIG. 15). Pivotal movement of the latching member 100 causes latching finger 102 of latching arm 100 to move out of contact with the movable contact arm 50 so that the arm 50 returns to its unstressed condition, and the conductive path is broken. Resetting of the device is achieved as described above. An exemplary embodiment of the circuitry used to sense faults and reset the conductive paths, is shown in FIG. 18.

As noted above, if opening and closing of electrical continuity in the neutral conductive path is desired, the above description for the phase conductive path is also applicable to the neutral conductive path.

Figure 19:
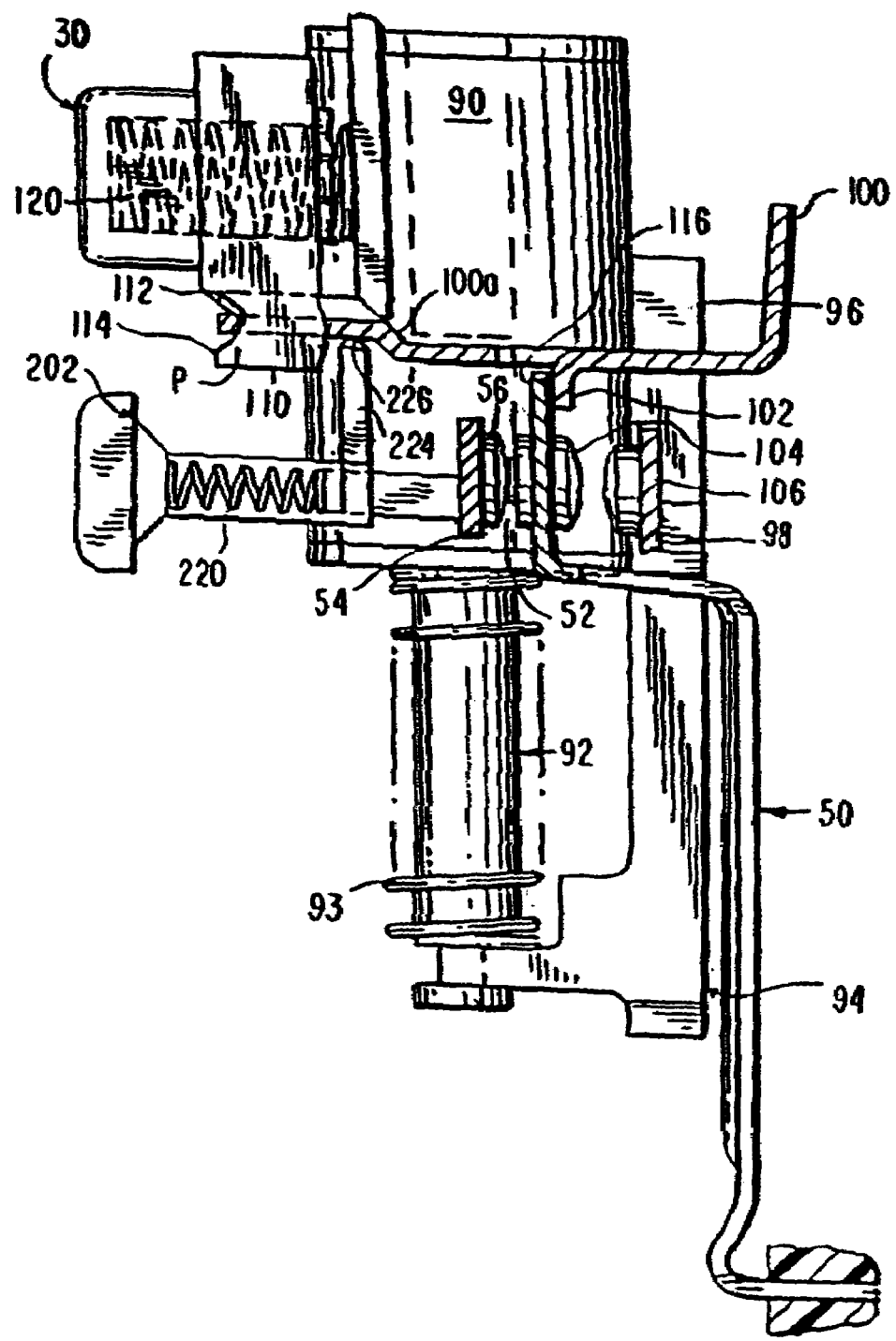
FIG. 19 is side elevational view, partly in section, of components of a portion of the alternative embodiment of the GFCI device shown in FIG. 13, illustrating the device in a set or circuit making position.
Figure 20:
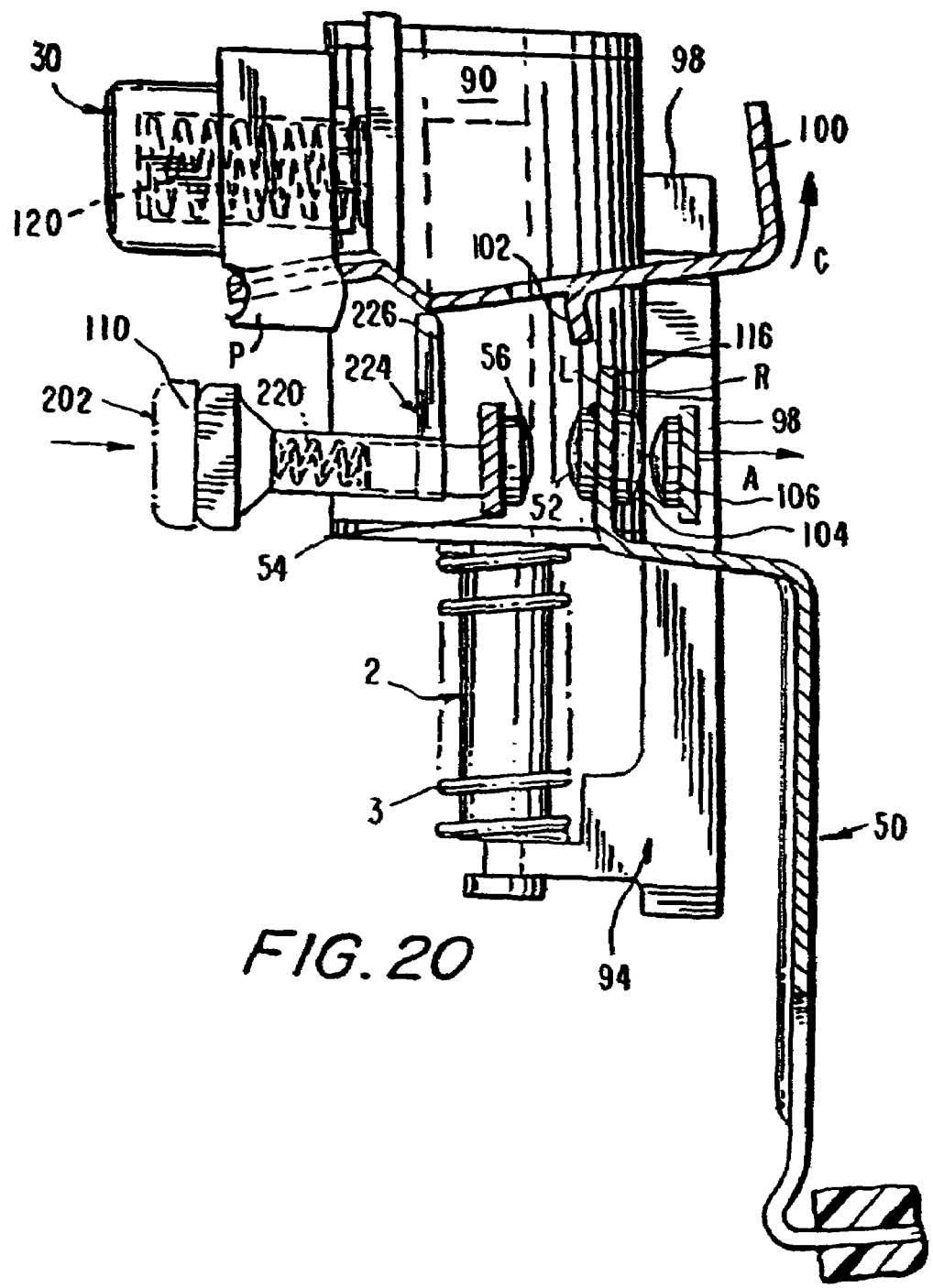
FIG. 20 is a side elevational view similar to FIG. 19, illustrating of the device in a circuit breaking position.

An alternative embodiment of the trip portion will be described with reference to FIGS. 19 and 20. In this embodiment, the trip portion includes a trip actuator 202 that at is movable between a set position, where contacts 52 and 56 are permitted to close or make contact, as seen in FIG. 19, and a trip position where contacts 52 and 56 are caused to open, as seen in FIG. 20. Spring 220 normally biases trip actuator 202 toward the set position. The trip portion also includes a trip arm 224 that extends from the trip actuator 202 so that a distal end 226 of the trip arm is in movable contact with the movable latching member 100. As noted above, the movable latching member 100 is, in this embodiment, common to the trip, circuit interrupting, reset and reset lockout portions and is used to make, break or lockout the electrical connections in the phase and/or neutral conductive paths.

In this embodiment, the movable latching member 100 includes a ramped portion 100*a* which facilitates opening and closing of electrical contacts 52 and 56 when the trip actuator 202 is moved between the set and trip positions, respectively. To illustrate, when the trip actuator 202 is in the set position, distal end 226 of trip arm 224 contacts the upper side of the ramped portion 10*a*, seen in FIG. 19. When the trip actuator 202 is depressed, the distal end 226 of the trip arm 224 moves along the ramp and pivots the latching member 60 about point P in the direction of arrow C causing latching finger 102 of the latching member 100 to move out of contact with the movable contact arm 50 so that the arm 50 returns to its unstressed condition, and the conductive path is broken. Resetting of the device is achieved as described above.

The circuit interrupting device according to the present application can be used in electrical systems, shown in the exemplary block diagram of FIG. 21. The system 240 includes a source of power 242, such as ac power in a home, at least one circuit interrupting device, e.g., circuit interrupting device 10 or 200, electrically connected to the power source, and one or more loads 244 connected to the circuit interrupting device. As an example of one such system, ac power supplied to single gang junction box in a home may be connected to a GFCI receptacle having one of the above described reverse wiring fault protection, independent trip or reset lockout features, or any combination of these features may be combined into the circuit interrupting device. Household appliances that are then plugged into the receptacle become the load or loads of the system.

As noted, although the components used during circuit interrupting and device reset operations are electro-mechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A circuit interrupting device comprising:
   a first electrical conductor;
   a second electrical conductor;
   a third electrical conductor where the first, second and third electrical conductors are electrically isolated from each other and at least one of said conductors is capable of electrically connecting with the other two conductors such that the first, second and third electrical conductors are electrically connected to each other; and
   a circuit interrupting portion positioned to electrically disconnect the first, second and third electrical conductors from each other upon the occurrence of a predetermined condition.

2. The circuit interrupting device of claim 1 where the first electrical conductor is capable of being electrically connected to a source of electricity, the second electrical conductor is capable of conducting electrical current to a load when electrically connected to the first electrical conductor and the third electrical conductor is capable of being electrically connected to a user accessible load.

3. The circuit interrupting device of claim 1 where the circuit interrupting portion has a circuit interrupter and the device further has a reset button which when depressed is either capable of activating at least a portion of the circuit interrupter to reestablish electrical continuity between the first, second and third electrical conductors or is not capable of activating the at least portion of the circuit interrupter preventing the device from reestablishing electrical continuity between the first second and third electrical conductors.

4. The circuit interrupting device of claim 1 where the circuit interrupting portion has a circuit interrupter and the device further has a reset button which when depressed is capable of activating at least a portion of the circuit interrupter to reestablish electrical continuity between the first second and third electrical conductors if electrical current is made available to activate the at least portion of the circuit interrupter when pressing the reset button.

5. The circuit interrupting device of claim 4 where the at least portion of the circuit interrupter is a plunger responsive to energizing and de-energizing of a coil.

6. The circuit interrupting device of claim 3 where the at least portion of the circuit interrupter is a plunger responsive to energizing and de-energizing of a coil.

7. The circuit interrupting device of claim 3 where the reestablishment of electrical continuity between the first, second and third electrical conductors is prevented if the circuit interrupting device is reverse wired.

8. The circuit interrupting device of claim 3 where the reestablishment of electrical continuity between the first, second and third electrical conductors is prevented if an open neutral condition exists.

9. The circuit interrupting device of claim 3 where the circuit interrupter has at least a coil and plunger assembly and electronic circuitry capable of sensing a predetermined condition.

10. The circuit interrupting device of claim 3 where at least one of the conductors moves to either reestablish electrical continuity between the first, second an third electrical conductors or electrically disconnect the first, second and third electrical conductors from each other.

11. The circuit interrupting device of claim 1 where at least one of the conductors is movable.

12. The circuit interrupting device of claim 1 where the predetermined condition comprises a ground fault, an arc fault, an appliance leakage fault, an equipment leakage fault, an immersion fault and a test cycle.

13. A circuit interrupting device comprising:
    a first electrical conductor;
    a second electrical conductor;
    a third electrical conductor
    the first, second and third electrical conductors having a first spatial arrangement wherein said conductors are all electrically connected with each other and a second spatial arrangement wherein said first, second and third electrical conductors are all electrically isolated from each other; and
    an electrical fault sensor and an electro-mechanical actuator connected and disposed to change the spatial arrangement of said conductors from said first spatial arrangement to said second spatial arrangement upon the occurrence of an electrical fault.

14. A circuit interrupting device as in claim 13 further comprising a reset assembly disposed to change the spatial arrangement of said first, second and third conductors from said second arrangement to said first arrangement.

15. A circuit interrupting device as in claim 13 wherein at least two of said conductors are electrically connected to respectively corresponding external electrical circuits and said electrical fault sensor is connected to sense an electrical fault in at least one of said external circuits.

16. A circuit interrupting device as in claim 13 further comprising:
a latch disposed to maintain said second arrangement when changed thereto from said first arrangement; and
a manually operable user-accessible circuit reset switch which is electrically connected to an electro-mechanical actuator disposed to unlatch said second spatial arrangement and to change the spatial arrangement of said conductors to said first spatial arrangement upon user actuation of said reset switch which is connected to complete a circuit with an externally accessible line terminal of said device.

17. A circuit interrupting device as in claim 16 wherein:
a common electro-mechanical actuator is used to change the arrangement of said first second and third conductors between said first and second arrangements; and
said reset switch is electrically connected to create a simulated fault condition within said device when actuated which causes electrical energization of said common electro-mechanical actuator.

18. A circuit interrupting device as in claim 17 wherein said electro-mechanical actuator is disposed to interact with a latch coupled to at least one of said conductors, said latch being configured and disposed (a) to latch said first spatial arrangement until automatically unlatched and changed to said second spatial arrangement upon occurrence of a fault condition and thereafter (b) to automatically latch said second spatial arrangement until unlatched and by user action re-set and re-latched to said first spatial arrangement.

19. A circuit interrupting device as in claim 18 wherein said latch comprises a mechanical latch member.

20. A method for insuring safe operation of a circuit interrupting device having first, second and third electrical conductors adapted for respective electrical connection to external line, load and user circuits, said method comprising:
moving at least one of said first, second and third electrical conductors to place them into a first spatial arrangement in which said conductors are all electrically connected with each other;
detecting an electrical fault, and
upon the occurrence of said electrical fault automatically moving at least one of said first, second and third conductors into a second spatial arrangement in which said conductors are all electrically isolated from one another.

21. A method as in claim 20 further comprising:
in response to user action, moving at least one of said conductors to reset said first, second and third conductors from said second configuration to said first configuration.

22. A method as in claim 20 further comprising:
latching said at least one movable conductor in place to maintain said first spatial arrangement until occurrence of said fault condition whereupon said at least one conductor is unlatched and moved to establish said second spatial arrangement; and
automatically latching said at least one movable conductor in place to maintain said second spatial arrangement until occurrence of user action unlatching and re-setting of said at least one conductor to said first spatial arrangement.

23. A circuit interrupting device comprising:
a first electrical line conductor including an electrical line connection terminal accessible externally of said device and at least one electrical contact located internally of said device;

a second electrical load conductor including an electrical load connection terminal accessible externally of said device and at least one electrical contact located internally of said device;
a third electrical face conductor including at least one user-accessible electrical socket connector terminal accessible to a user-installed connecting plug from the external face of the device and at least one electrical contact located internally of said device;
at least one of the internally located electrical contacts of said first, second and third electrical conductors being movable between (a) a first spatial arrangement wherein said conductors are all electrically connected with each other and (b) a second spatial arrangement wherein said first, second and third electrical conductors are all electrically isolated from with each other;
an electrical fault sensor electrically coupled to at least one of said conductors, and
an electro-mechanical operator which is electrically coupled to said fault sensor and mechanically coupled to automatically effect movement of said at least one movable electrical contact from said first configuration to said second configuration upon the occurrence of an electrical fault sensed by said fault sensor.

24. A circuit interrupting device as in claim 23 further comprising:
a manually operable reset actuator accessible from the exterior of said device, and
a reset assembly coupled to said reset actuator and disposed to move said at least one movable electrical contact from said second configuration to said first configuration upon user operation of said reset actuator.

25. A circuit interrupting device as in claim 24 wherein:
said reset assembly includes an electro-mechanical operator electrically coupled to said line conductor and to an electrical switch contact operated by said reset actuator,
said reset assembly also being mechanically coupled to change said at least one movable electrical contact from said second spatial arrangement to said first spatial arrangement upon operation of said reset actuator.

26. A circuit interrupting device as in claim 25 wherein said electro-mechanical operator is configured and disposed to (a) automatically unlatch said at least one contact and effect change from said first to said second spatial arrangement upon occurrence of an electrical fault and (b) unlatch said at least one contact and effect change from said second spatial arrangement to said first spatial arrangement upon user reset action.

27. A method for insuring safe operation of a circuit interrupting device having external electrical line, load and user-accessible face electrical connections, said method comprising:
providing separate first, second and third electrical conductor structures for said external electrical line, load and user-accessible face connections respectively, each of said conductor structures including at least one electrical contact located internally of said device and at least one of said internal electrical contacts being mounted movably with respect to the remainder of the contact(s) between (a) a first spatial arrangement wherein said internal conductor contacts and conductor structures are all electrically connected with each other and (b) a second spatial arrangement wherein said internal conductor contacts and said electrical conductor structures are all electrically isolated from each other;

placing and latching said at least one movable electrical contact into said first spatial arrangement in which said conductors are all electrically connected with each other;

automatically detecting an electrical fault, automatically unlatching and placing said at least one movable electrical contact into said second spatial arrangement in which said conductors are all electrically isolated from one another upon the occurrence of said detected electrical fault; and automatically latching said at least one movable electrical contact in said second spatial arrangement.

28. A method as in claim 27 wherein at least two of said conductors are connected to respectively corresponding external electrical circuits and said electrical fault is present in at least one of said external circuits.

29. A method as in claim 27 further comprising:
re-setting and re-latching said at least one movable contact from said second spatial arrangement to said first spatial arrangement in response to manual user action.

30. A method as in claim 29 wherein said placing, latching and resetting steps are each performed using, at least in part, the same electro-mechanical operator.

31. A method as in claim 30 wherein:
said electro-mechanical operator is (a) automatically electrically energized by a fault detector that is electrically coupled to said externally accessible connections and (b) manually electrically energized by an electrical switch operated by an externally accessible user-operated reset actuator; and
said electro-mechanical operator is configured and disposed to mechanically move a latch member.

32. A circuit interrupting device for installation in a three-wire electrical circuit having phase, neutral and ground conductor wires feeding electricity from a source line circuit to at least one downstream load circuit, said circuit interrupting device comprising:
a non-conductive housing having upper and lower mounting flanges and a user-accessible front face presenting a pair of female electrical sockets, each socket having three-recesses with conductive connection terminals respectively configured for user-controlled connection to phase, neutral and ground male terminals of at least one electrical load plug,
said housing also having an installer-accessible body presenting (a) a first pair of conductive connection terminals adapted for respective electrical connection to line and load phase wires, (b) a second pair of conductive connection terminals adapted for respective electrical connection to line and load neutral wires, and (c) at least one third conductive connection terminal adapted for electrical connection to at least one ground wire;
a trio of first electrical conductors disposed internally of said housing and respectively electrically connected to the conductive phase connection terminals;
a trio of second electrical conductors disposed internally of said housing and respectively electrically connected to the conductive neutral connection terminals;
said trio of first electrical conductors having a first spatial arrangement wherein said trio of first electrical conductors are all electrically connected with each other and a second spatial arrangement wherein said trio of first electrical conductors are all electrically isolated from each other;
said trio of second electrical conductors having a first spatial arrangement wherein said trio of second electrical conductors are all electrically connected with each other and a second spatial arrangement wherein said trio of second electrical conductors are all electrically isolated from each other; and
an electrical fault sensor and an electro-mechanical actuator connected and disposed to change the spatial arrangement of said trios of conductors respectively from said first spatial arrangement to said second spatial arrangement upon the occurrence of an electrical fault.

33. A circuit interrupting device as in claim 32 further comprising a reset assembly disposed to change the spatial arrangement of said trios of conductors respectively from said second arrangement to said first arrangement.

34. A circuit interrupting device as in claim 32 wherein said reset assembly is electrically connected with the line phase terminal and comprises:
a manually operable electrical reset switch, and
an electro-mechanical transducer electrically connected with said reset switch and mechanically coupled to cause reconfiguration of both said trios of conductors from said second arrangement to said first arrangement when said reset switch is operated.

35. A circuit interrupting device as in claim 32 further comprising:
latch disposed to maintain both said trios in their respective second arrangements when changed thereto from said first arrangements; and
a manually operable user-accessible circuit reset switch which is electrically connected to an electro-mechanical actuator disposed to unlatch said second spatial arrangements and to change the spatial arrangements of said trios of conductors to said first spatial arrangements upon user actuation of said reset switch which is connected to complete a circuit connected to the line phase terminal.

36. A circuit interrupting device as in claim 35 wherein:
a common electro-mechanical actuator is used to change the arrangements of said trios of conductors between said first and second arrangements; and
said reset switch is electrically connected to create a simulated fault condition within said device when actuated which causes electrical energization of said common electro-mechanical actuator.

37. A circuit interrupting device as in claim 36 wherein said electro-mechanical actuator is disposed to interact with a latch coupled to at least one conductor of each of said trios, said latch being configured and disposed (a) to latch said first spatial arrangements until unlatched and changed to said second spatial arrangements upon occurrence of a fault condition and thereafter (b) to latch said second spatial arrangements until unlatched and by user action re-set and re-latched to said first spatial arrangements.

38. A circuit interrupting device as in claim 37 wherein said latch comprises at least one mechanical latch member.

39. A method for insuring safe operation of a circuit interrupting device adapted for installation in a three-wire electrical circuit having phase, neutral and ground conductor wires feeding electricity from a source line circuit to at least one downstream load circuit, said method comprising:
moving a trio of first electrical conductors to place them into a first spatial arrangement in which they are all electrically connected with each other, said trio of first electrical conductors being respectively electrically connected to at least one user-accessible phase terminal, an installer-accessible phase line terminal, and an installer-accessible phase load terminal;
moving a trio of second electrical conductors to place them into a first spatial arrangement in which they are all electrically connected with each other, said trio of second electrical conductors being respectively electrically connected to at least one user-accessible neutral terminal, an installer-accessible neutral line terminal, and an installer-accessible neutral load terminal;

detecting an electrical fault, and upon the occurrence of said electrical fault, automatically moving said trios of conductors into respective second spatial arrangements in which the conductors of each trio are all electrically isolated from one another.

40. A method as in claim 39 further comprising:

in response to user action, moving at least one conductor in each of said trios to reset said trios from said second arrangements to said first arrangements.

41. A method as in claim 39 further comprising:

latching said at least one movable conductor of each trio in place to maintain said first spatial arrangements until occurrence of said fault condition whereupon said at least one conductor of each trio is automatically unlatched and moved to establish said second spatial arrangements; and automaticafly latching said at least one movable conductor of each trio in place to maintain said second spatial arrangements until occurrence of user action unlatching and re-selling of said at least one conductor of each trio to said first spatial arrangements.

42. A method for insuring safe operation of a circuit interrupting device having, for each of phase and neutral circuit connections, external electrical line, load and user-accessible face electrical connections, said method comprising:

providing for phase connections to separate first, second and third electrical conductor structures for said external electrical line, load and user-accessible face connections respectively, each of said conductor structures including at least one electrical contact located internally of said device and at least one of said internal electrical contacts being mounted movably with respect to the remainder of the contact(s) between (a) a first spatial arrangement wherein said internal conductor contacts and conductor structures are all electrically connected with each other and (b) a second spatial arrangement wherein said internal conductor contacts and said electrical conductor structures are all electrically isolated from each other;

providing for neutral connections to separate first, second and third electrical conductor structures for said external electrical line, load and user-accessible face connections respectively, each of said conductor structures including at least one electrical contact located internally of said device and at least one of said internal electrical contacts being mounted movably with respect to the remainder of the contact(s) between (a) a first spatial arrangement wherein said internal conductor contacts and conductor structures are all electrically connected with each other and (b) a second spatial arrangement wherein said internal conductor contacts and said electrical conductor structures are all electrically isolated from each other;

placing and latching said at least one movable electrical contacts into said first spatial arrangements in which said phase conductors are all electrically connected with each other and said neutral conductors are all electrically connected with each other;

automatically detecting an electrical fault, automatically unlatching and placing said at least one movable electrical contacts into said second spatial arrangements in which said phase conductors are all electrically isolated from one another and said neutral conductors are all electrically isolated from one another upon the occurrence of said detected electrical fault; and automatically latching said at least one movable electrical contacts in said second spatial arrangements.

43. A method as in claim 42 further comprising:

re-setting and re-latching said at least one movable contacts from said second spatial arrangements to said first spatial arrangements in response to manual user action.

44. A method as in claim 43 wherein said placing, latching and resetting steps are each performed using, at least in part, the same electro-mechanical operator.

45. A method as in claim 44 wherein:

said electro-mechanical operator is (a) automatically electrically energized by a fault detector that is electrically coupled to said installer-accessible connections and (b) manually electrically energized by an electrical switch operated by an externally accessible user-operated reset actuator; and said electro-mechanical operator is configured and disposed to mechanically move a latch member.

\* \* \* \* \*

UNITED STATES PATENT AND TRADEMARK OFFICE
CERTIFICATE OF CORRECTION

| | |
|---|---|
| PATENT NO. | : 7,463,124 B2 |
| APPLICATION NO. | : 10/977929 |
| DATED | : December 9, 2008 |
| INVENTOR(S) | : Nicholas L. DiSalvo et al. |

It is certified that error appears in the above-identified patent and that said Letters Patent is hereby corrected as shown below:

On Title Page of patent under "Priority Information":

After "now U.S. Patent No. 6,246,558 which issued on June 12, 2001," please add the following:

-- which is a continuation of an application having Serial No. 09/369,759 filed on August 6, 1999, now U.S. Patent No. 6,282,070 which issued on August 28, 2001, --

Signed and Sealed this

Fourteenth Day of July, 2009

JOHN DOLL
*Acting Director of the United States Patent and Trademark Office*